Jan. 6, 1970 R. W. LARSON ET AL 3,487,864
HIGH-SPEED TREE HARVESTING APPARATUS
Filed Oct. 25, 1967 14 Sheets-Sheet 1

INVENTORS
ROBERT W. LARSON
JOHN P. LUNDBERG
BY Dugger Peterson
Johnson & Westman
ATTORNEYS

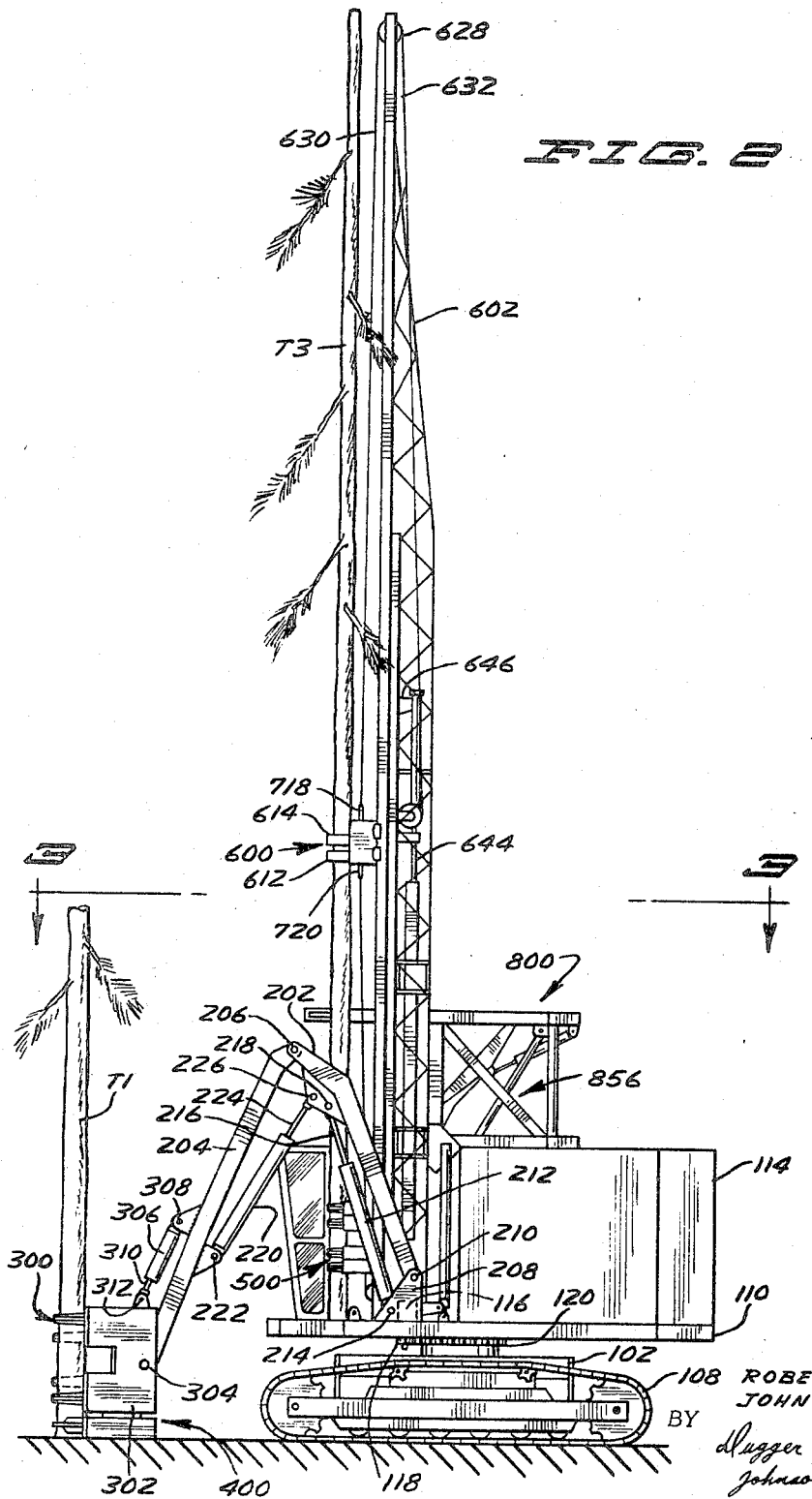

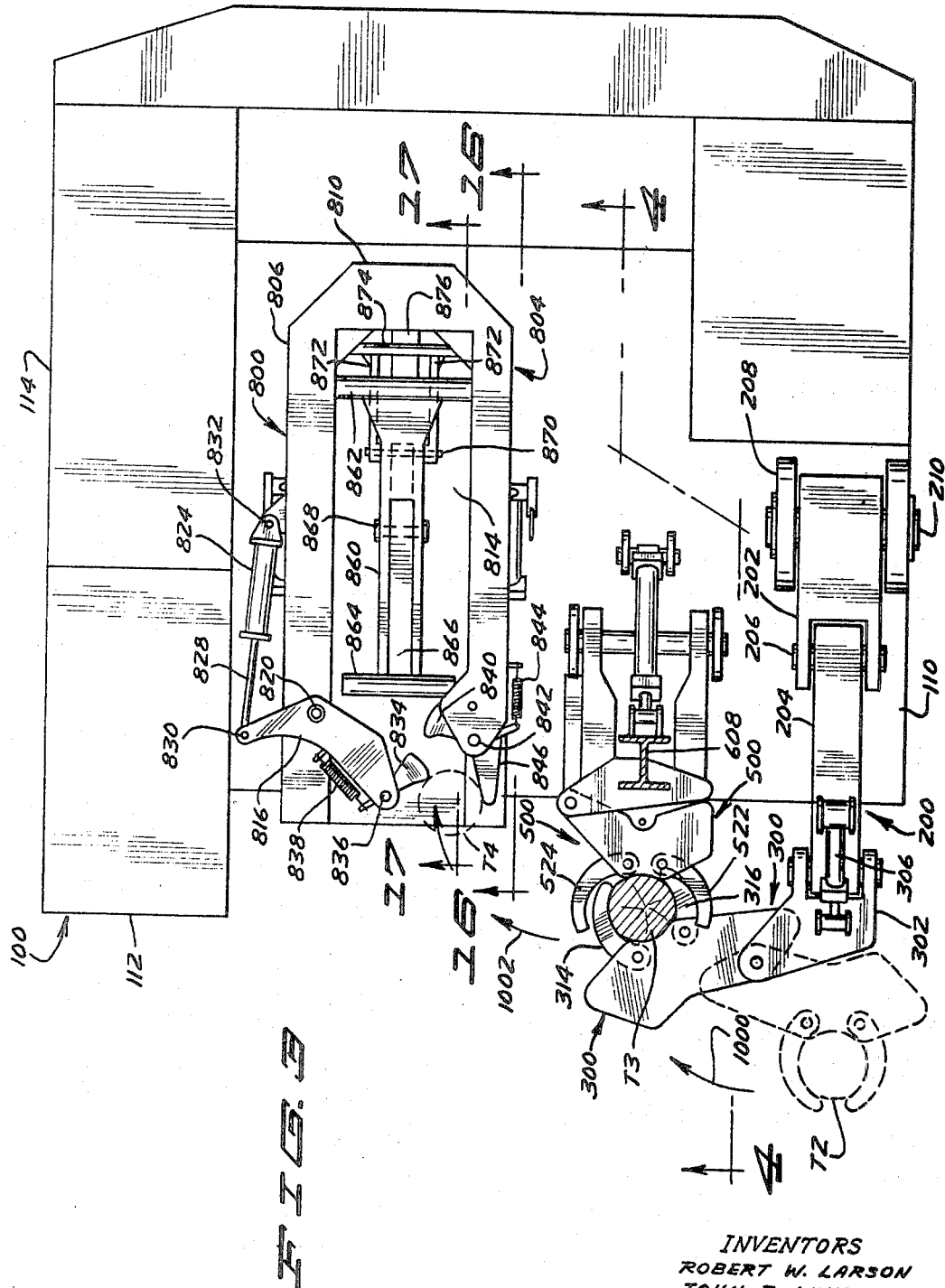

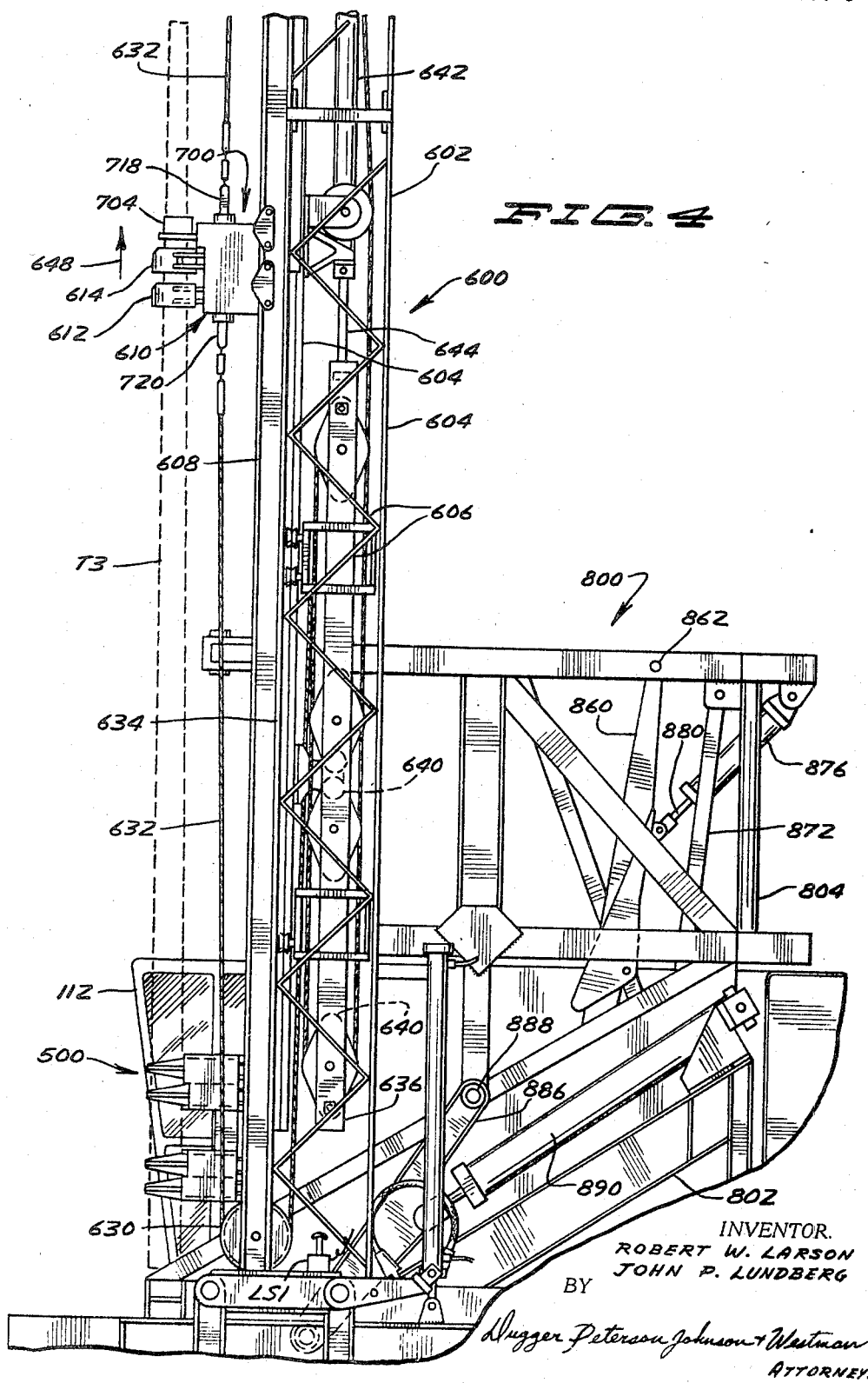

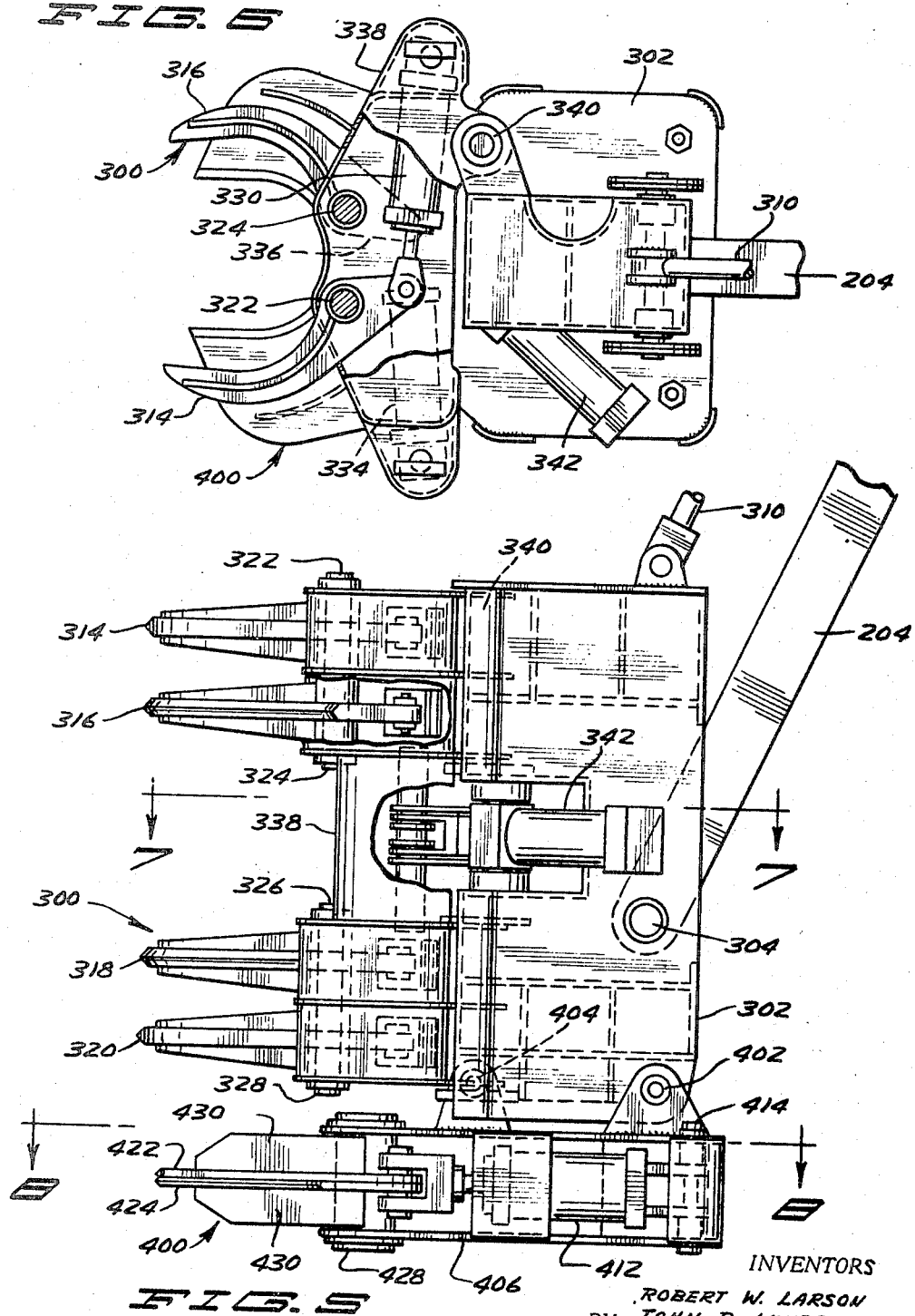

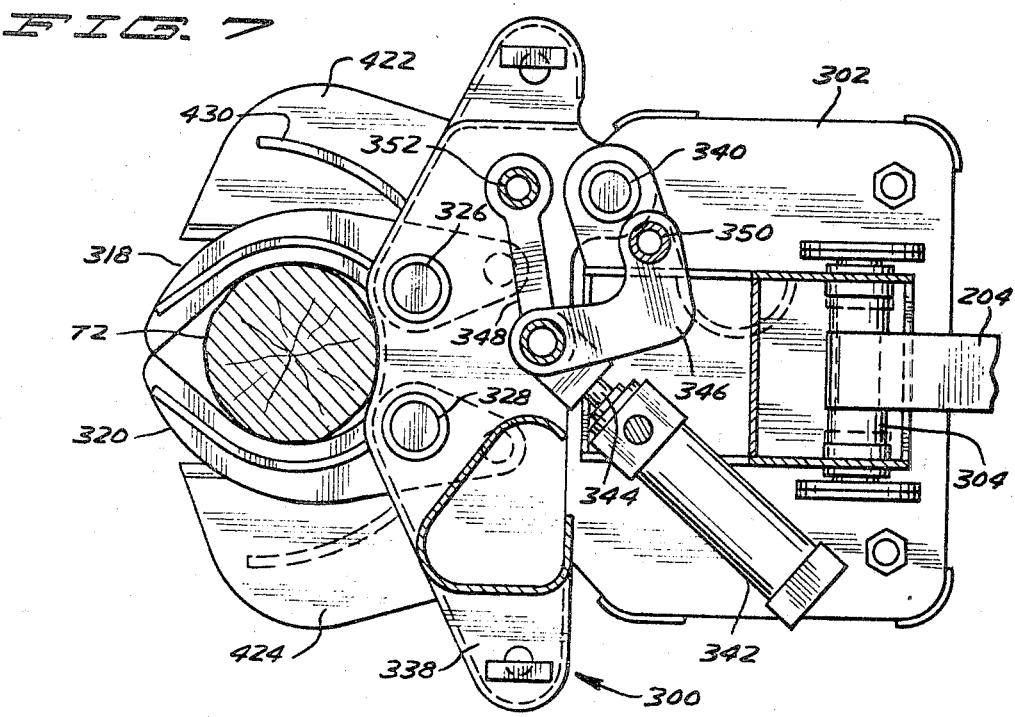
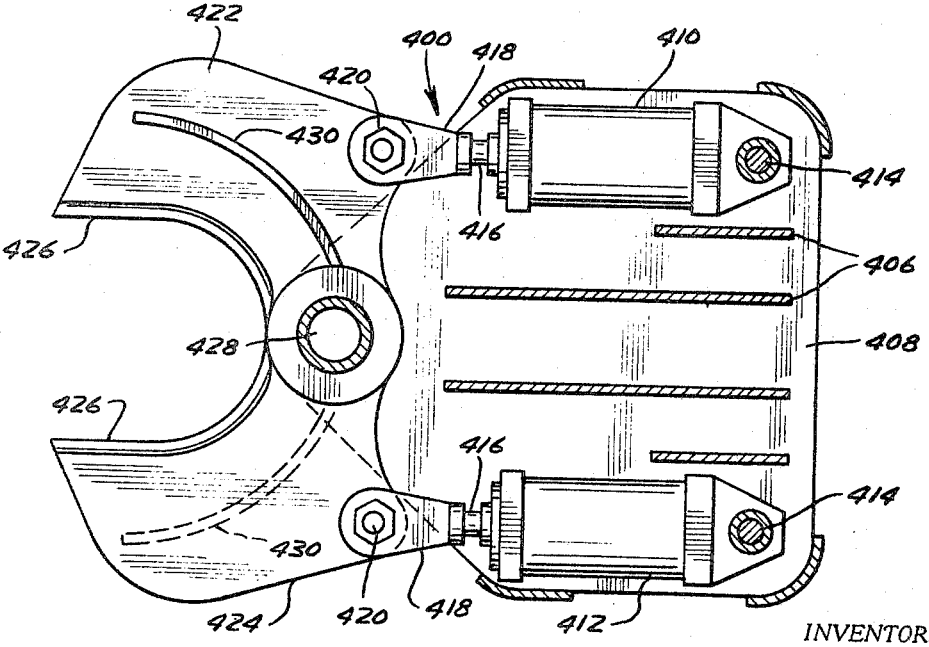

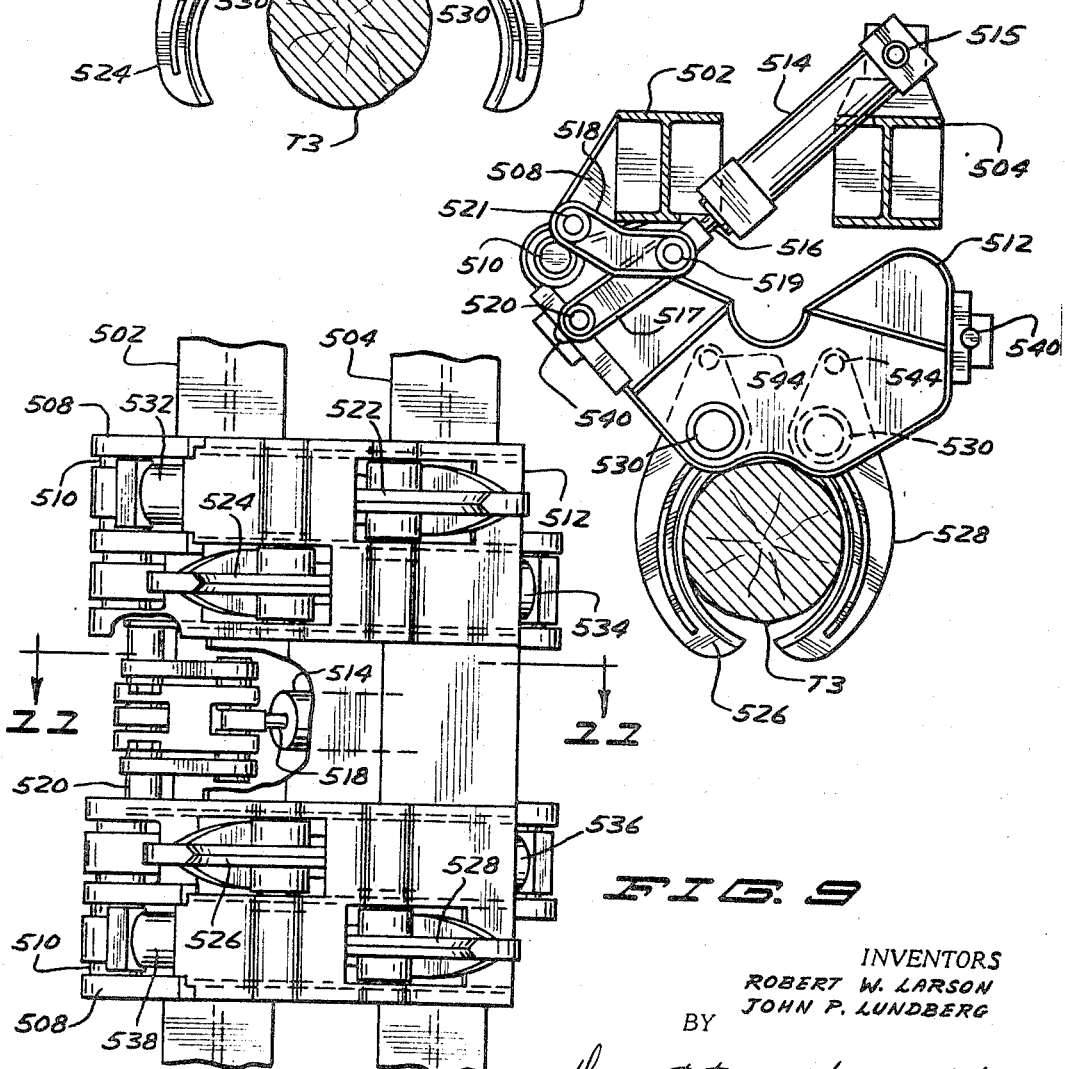

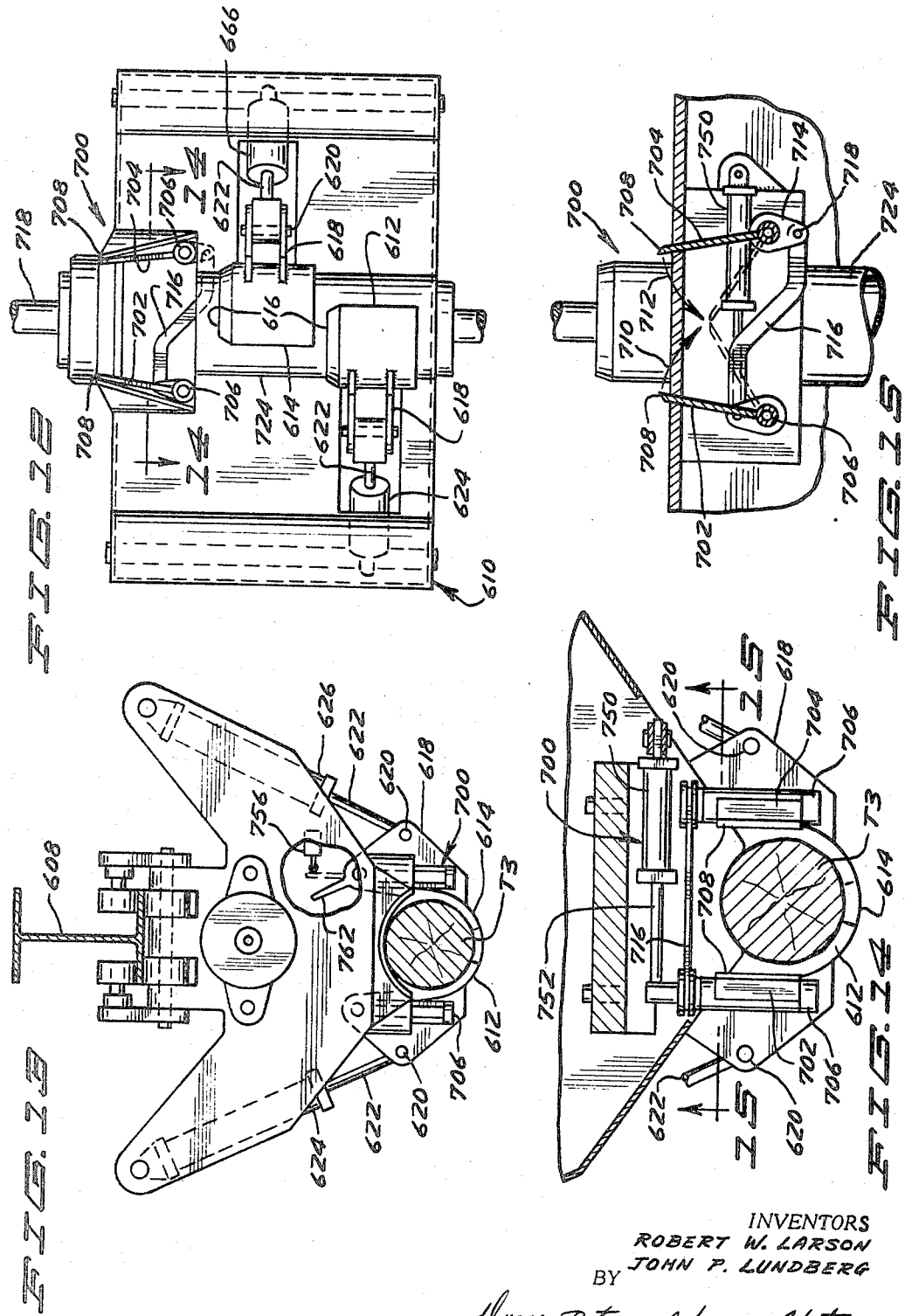

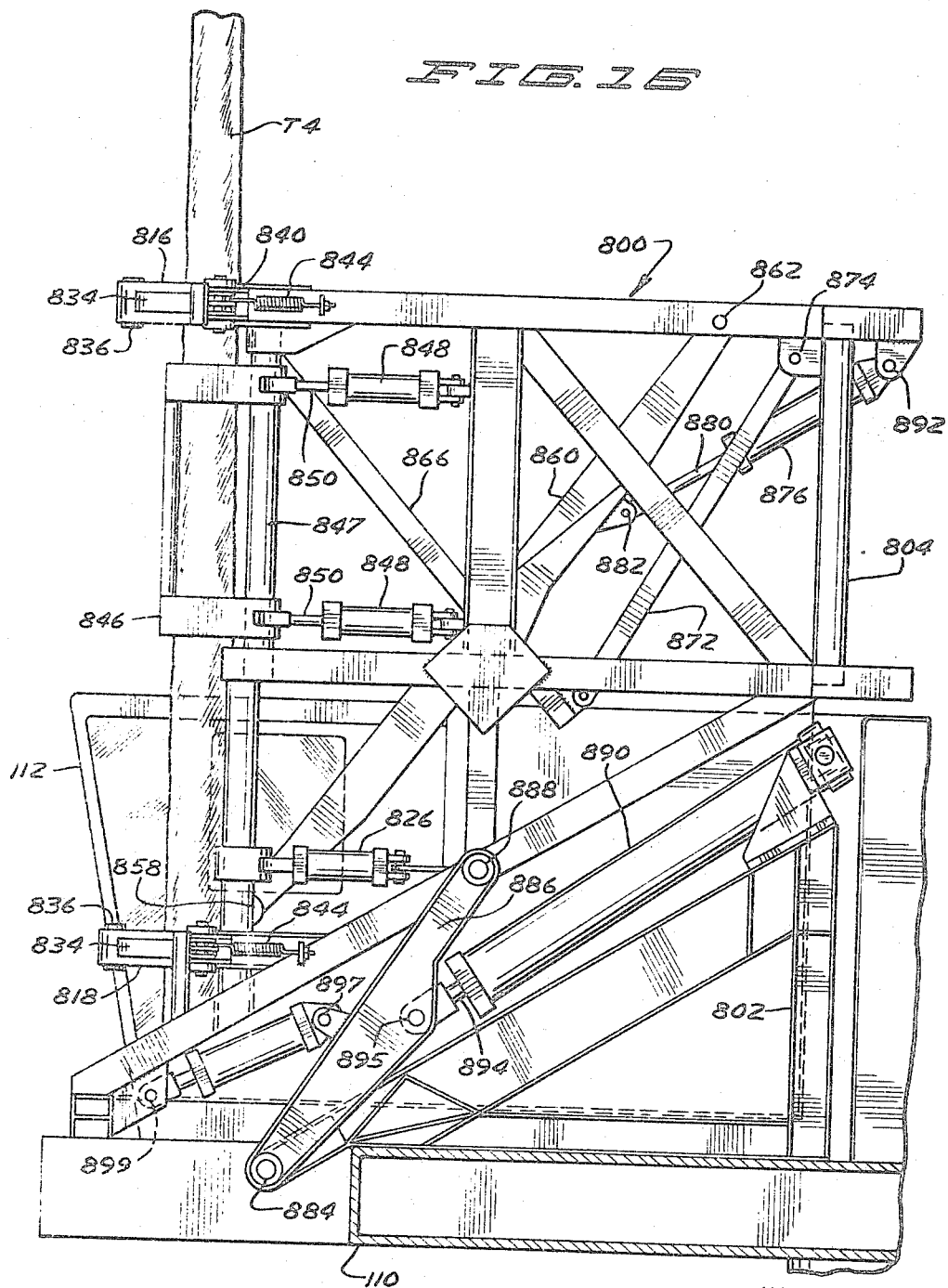

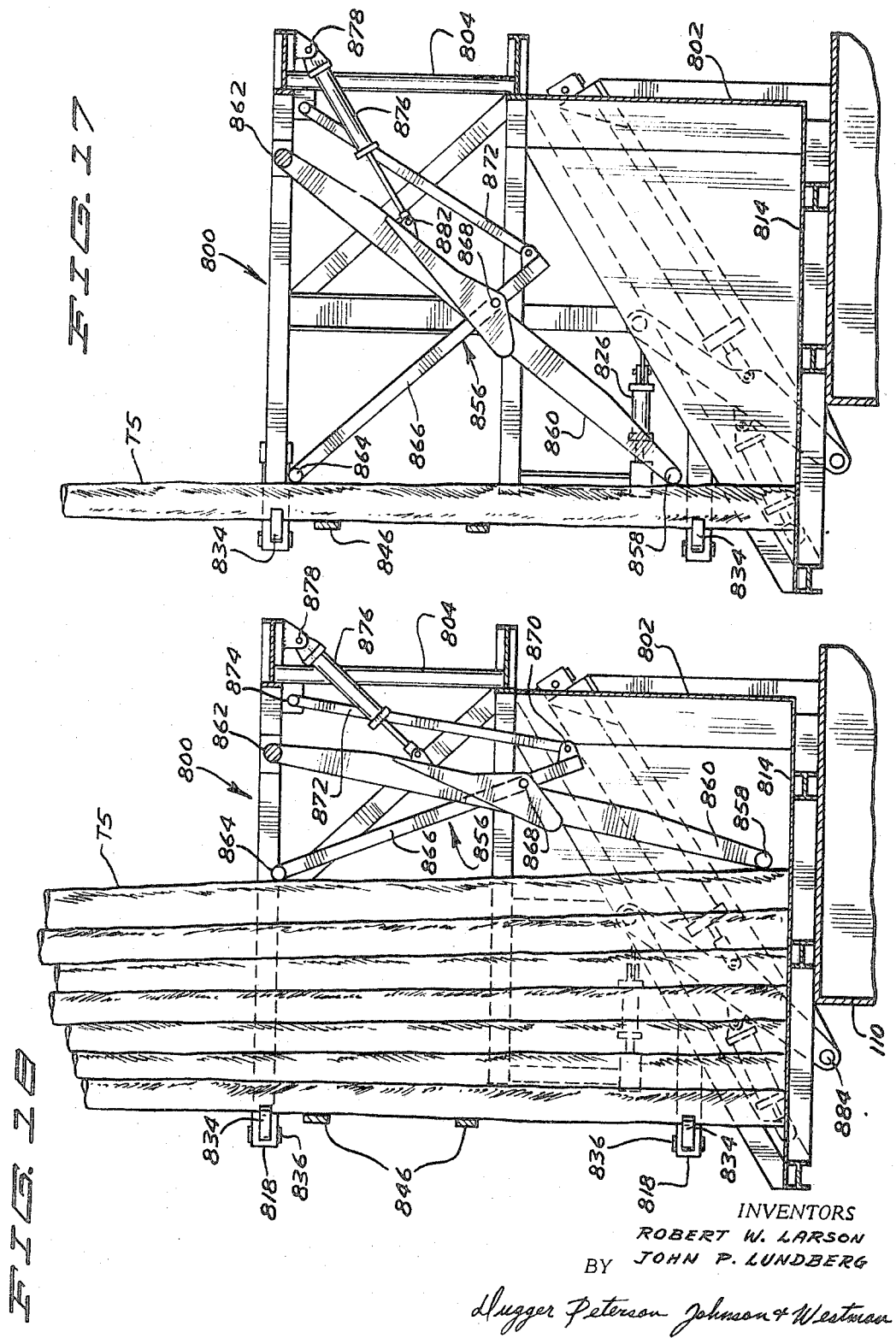

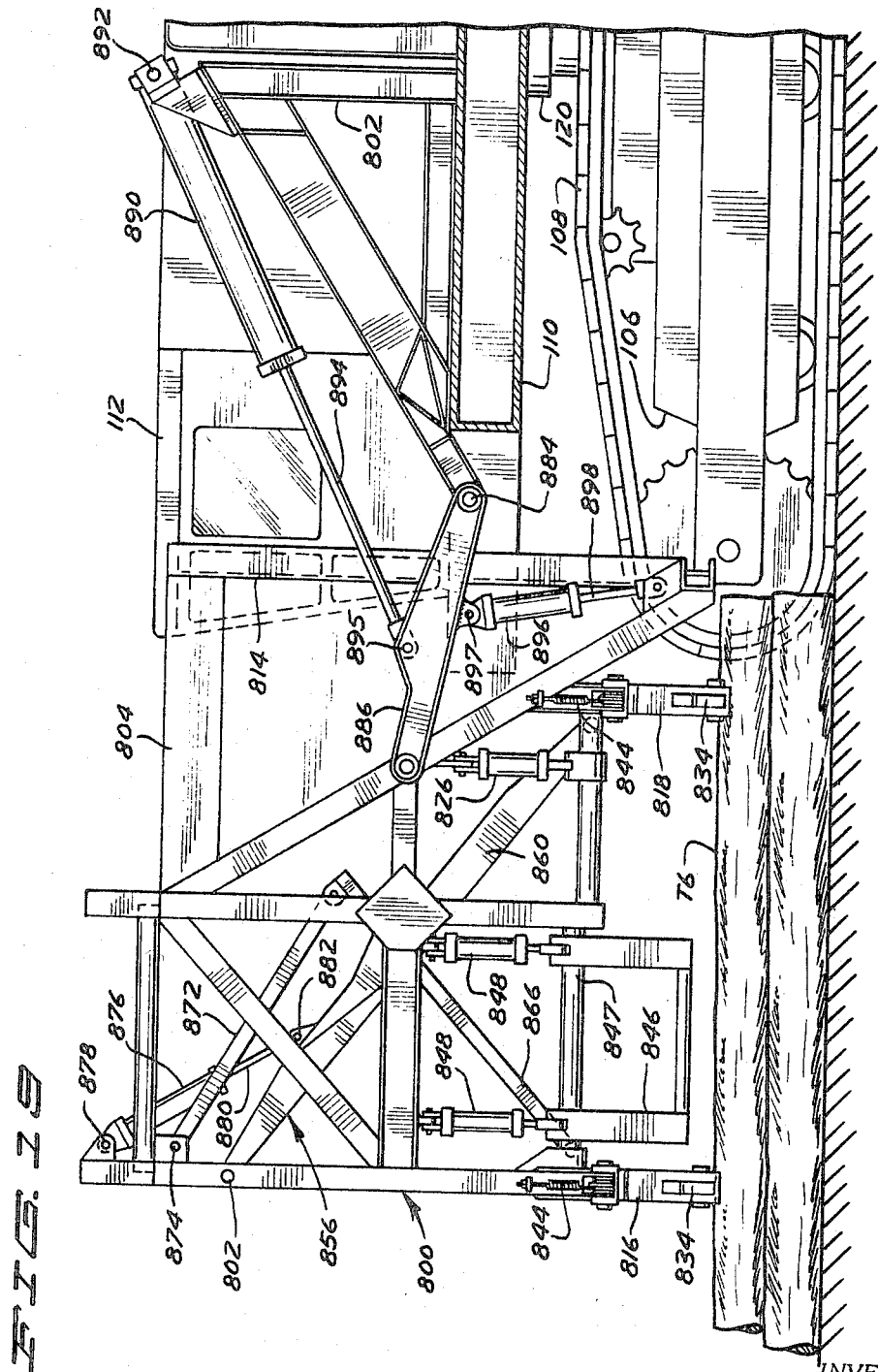

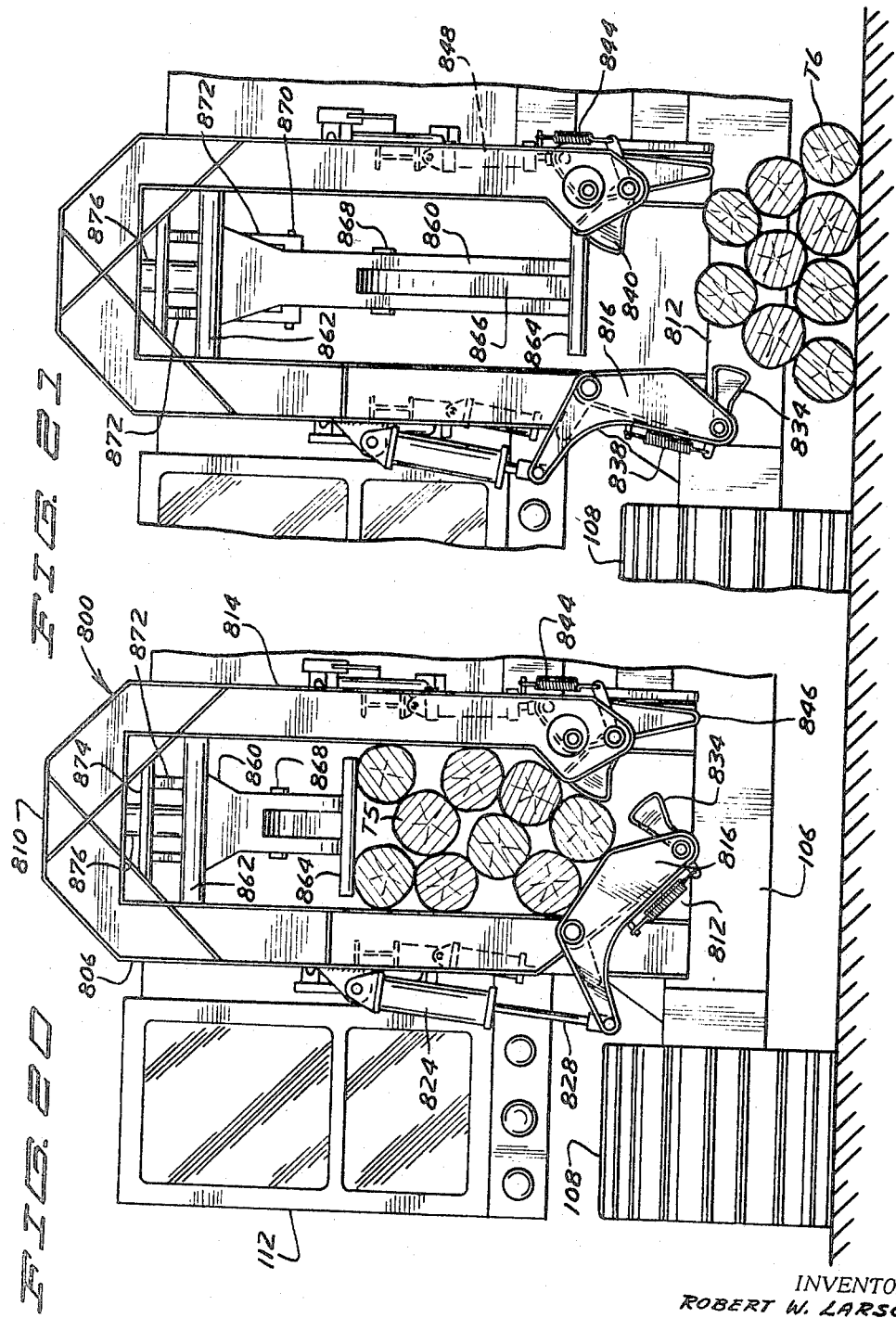

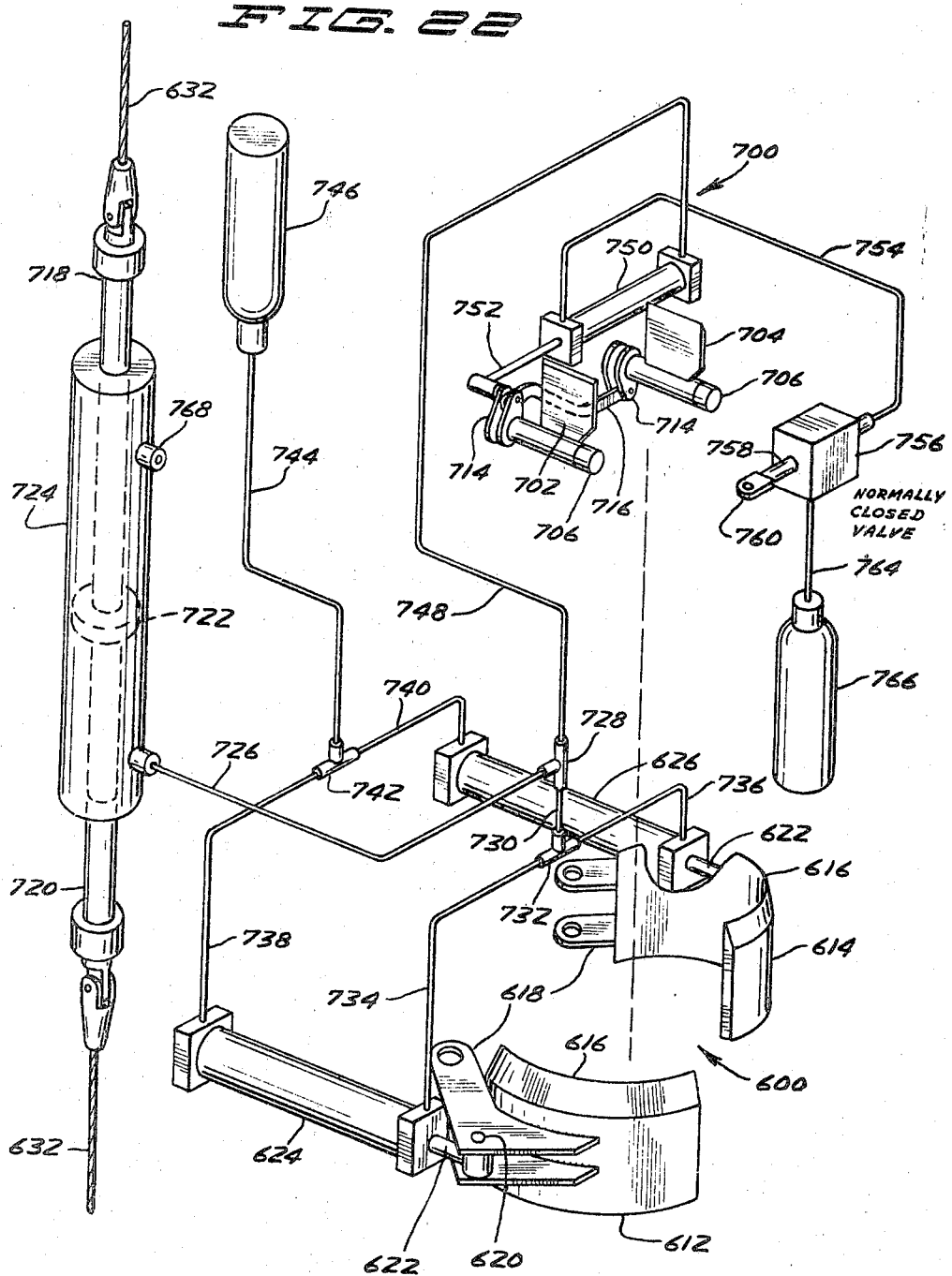

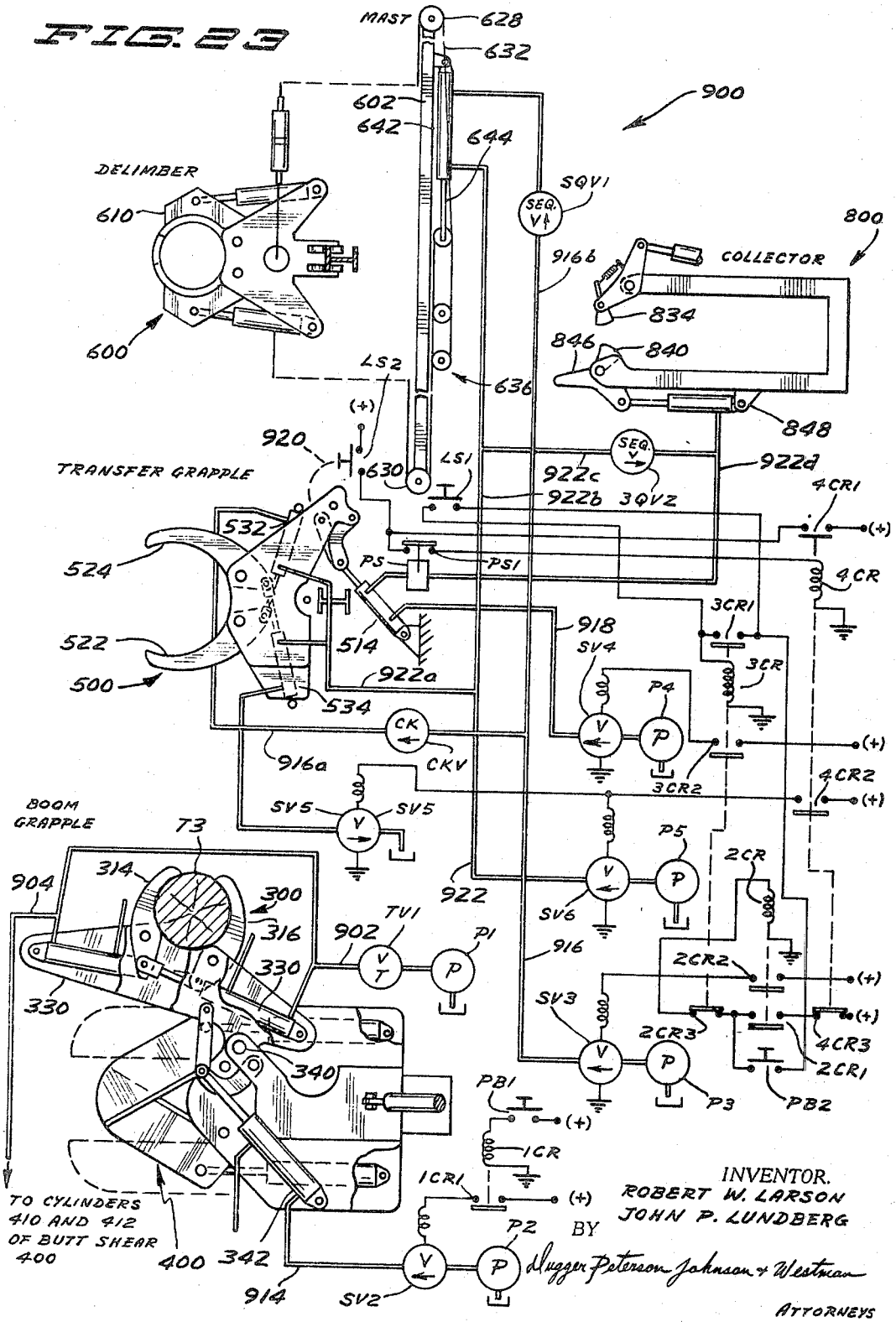

United States Patent Office 3,487,864
Patented Jan. 6, 1970

3,487,864
HIGH-SPEED TREE HARVESTING APPARATUS
Robert W. Larson, Port Arthur, Ontario, Canada, and John P. Lundberg, Washburn, Wis., assignors to Beloit Corporation, Beloit, Wis., a corporation of Wisconsin
Filed Oct. 25, 1967, Ser. No. 677,951
Int. Cl. B27c 9/00
U.S. Cl. 144—3     49 Claims

ABSTRACT OF THE DISCLOSURE

A grapple is mounted at the free end of a boom assembly that is supported at the other end on the swing platform of a vehicle. Immediately under the boom grapple is a shearing mechanism. When the boom assembly is retracted, the boom grapple is located adjacent a transfer grapple and is capable of swinging the cut tree so that it can be received by the transfer grapple. While held by the transfer grapple, a delimbing head is pulled rapidly upwardly along the tree so as to sever the branches therefrom by impact shearing. After the tree has been delimbed, as determined by the diminished size of the tree, a topping mechanism carried on the delimbing head is automatically made operative to cut off the top of the tree. The transfer grapple is mounted for swinging motion so that the now delimbed tree can be transferred to a collector. When the collector becomes sufficiently full of delimbed trees, the platform on which the boom assembly, the delimbing means and the collector are mounted, is swung through an arc which is usually 180° and the collector then tilted into a horizontal position to dump the accumulated trees onto the ground so that they can then be skidded to their destination.

BACKGROUND OF THE INVENTION

Field of the invention

This invention relates generally to equipment for tree-length logging, and pertains more particularly to mobile apparatus that will cut, delimb and collect trees as it moves through a wooded area.

Description of the prior art

United States Patent No. 3,252,487 for "Apparatus for Delimbing and Felling Trees" was granted on May 24, 1966 to Robert W. Larson et al. While the apparatus disclosed in the patent has operated satisfactorily in actual practice, nonetheless it necessitates the processing of trees on a single tree basis. More specifically, the alluded-to patent deals with the delimbing of a tree while still standing, the then cutting of the tree and then immediately depositing the tree-length log on the ground. This entails an objectionable amount of maneuvering as far as the apparatus is concerned, especially as far as depositing each tree after it has been delimbed and felled. Furthermore, since the apparatus must handle only one tree at a time, the next tree must await a complete processing of the preceding one.

SUMMARY OF THE INVENTION

While the present invention is concerned with the logging of trees while still vertical, it does so in a manner such as to make full utilization of the equipment. Thus, when a tree is cut, it is delivered to the delimbing means located centrally on the vehicle while still in a vertical position. After delivery to the delimbing means, the boom assembly and the grapple, as well as the shear mechanism mounted thereon, can be used for foraging the next tree while the preceding tree is in the process of having its limbs removed. Also, the present invention allows a sizable number of tree-length logs to be accumulated while still in their vertical position so that the individual delimbed trees or tree-length logs need not be laid on the ground thus obviating the need for swinging the vehicle's platform for each tree. After a sufficient number of trees has been collected, the swing platform is rotated through approximately 180° so that the trees contained in the collector can be gravitationally dumped onto the ground in the path made by the vehicle itself as it progresses through the woods. A sizable sector therefore can be cleared which will allow the platform to be swung through greater angles without interference from still standing trees. If desired, the trees that are accumulated on the vehicle can be secured with heavy wire so as to form bundles that can be laid on the ground. In any event, the only other equipment needed is a skidder in order to remove the trees to a remote vantage point for slashing or further transportation.

BRIEF DESCRIPTION OF THE DRAWINGS

FIGURE 2 is a side elevational view illustrating the apparatus in the same position as depicted in FIGURE 1 but in addition illustrating a cut tree being delimbed;

FIGURE 3 is a top plan view of our apparatus with the boom assembly retracted and the boom grapple delivering a cut tree to the transfer boom located at the delimbing station, the collector not as yet having received its first delimbed tree;

FIGURE 4 is an enlarged side elevational view of the delimbing means, the delimbing head appearing in substantially the same position as shown in FIGURE 2;

FIGURE 5 is a side elevational view illustrating the details of the boom grapple and the subjacent shearing mechanism;

FIGURE 6 is a plan view corresponding to FIGURE 5;

FIGURE 7 is a sectional view taken generally in the direction of line 7—7 of FIGURE 5, the grapple jaws being illustrated in a tree-gripping relationship;

FIGURE 8 is a sectional view taken in the direction of line 8—8 of FIGURE 5 for the purpose of illustrating to better advantage the shearing mechanism, the shear blades being pictured in their separated relationship for the accommodation of a tree therebetween;

FIGURE 9 is a front elevational view of the transfer grapple;

FIGURE 10 is a plan view of the transfer grapple pictured in FIGURE 9;

FIGURE 11 is a view taken in the direction of line 11—11 of FIGURE 9, the view illustrating a tree gripped by the transfer grapple jaws;

FIGURE 12 is a front elevational view of the delimbing head and topping mechanism;

FIGURE 13 is a plan view of the delimbing head, a portion being broken away so as to illustrate the cam that triggers the topping mechanism into operation after a tree has been delimbed;

FIGURE 14 is a sectional view taken in the direction of line 14—14 of FIGURE 12 for the purpose of showing the major components constituting the topping mechanism;

FIGURE 15 is a sectional view taken in the direction of line 15—15 of FIGURE 14, this view illustrating the relationship of the knife blades of the topping mechanism prior to being pivoted inwardly to accomplish the topping of a tree;

FIGURE 16 is a side elevational view of the collector which accumulates the cut and delimbed trees;

FIGURE 17 is a side elevational view similar to FIGURE 16 but with certain parts removed so as to show more clearly the restraining mechanism that is urged progressively to the right as trees are successively pushed into the collector through its gated opening;

FIGURE 18 illustrates the collector with the restraining mechanism fully collapsed which is the situation when the collector is full of trees;

FIGURE 19 is a side elevational view of the collector after it has been tilted into a horizontal position, the view showing the trees after they have been gravitationally dumped from the collector;

FIGURE 20 is an end view taken from the left in FIGURE 19 but illustrating the collector prior to dumping the trees;

FIGURE 21 is another end view very similar to FIGURE 20 but with the trees dumped onto the ground as illustrated in FIGURE 19;

FIGURE 22 is a perspective view of the delimbing jaws and the hydraulic circuitry for urging such jaws against the tree as the delimbing head is moved upwardly along the tree, and also illustrating in considerable detail the topping mechanism that is actuated once the delimbing has been completed, and FIGURE 23 is a combined hydraulic and electrical diagram illustrating the indexing or sequencing that takes place during the harvesting of trees when utilizing the teachings of the present invention, certain mechanical components being superimposed thereon in order to facilitate a comprehension of the diagram.

DESCRIPTION OF THE PREFERRED EMBODIMENT

(a) Vehicle

Figure 1:
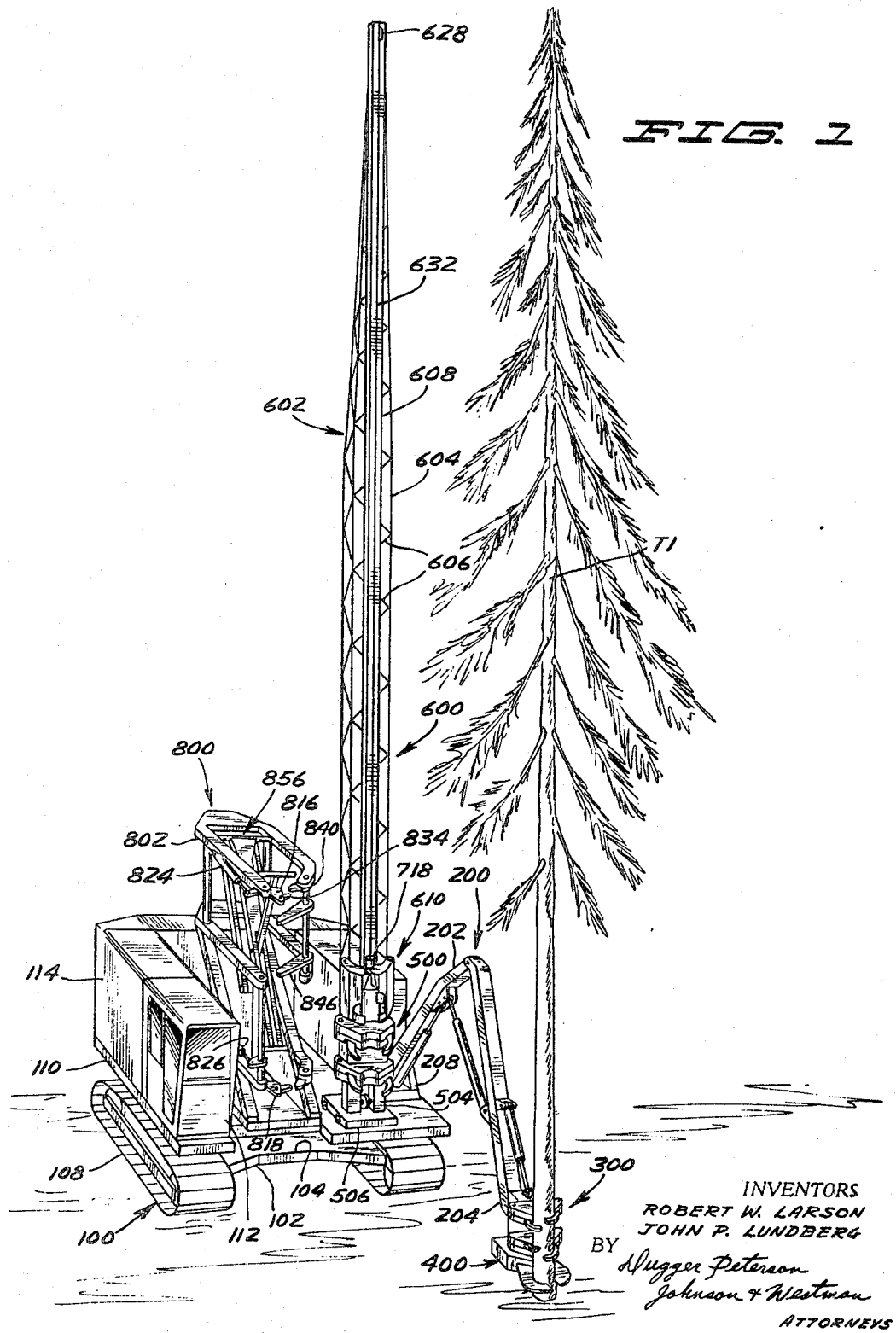
FIGURE 1 is a perspective view of high speed tree harvesting apparatus exemplifying our invention, the apparatus cutting its first tree.

Referring now in detail to the drawings, it will be noted that a vehicle has been designated generally by the reference numeral 100. The vehicle 100 includes a chassis 102 having a notch or recess 104 at its forward end (see FIGURE 1) and a similar notch or recess 106 at its rear end (see FIGURE 20). The purpose of the notches 104 and 106, more particularly the notch 106, will become manifest hereinafter. A pair of endless tracks 108 are also included in the vehicle 100. Still further, the vehicle 100 includes a swing platform 110 having an operator's cab 112 mounted thereon and also a pump housing 114. The pump within the housing 114 supplies hydraulic fluid under pressure to a hydraulic motor 116 of the rotary type. A shaft extends downwardly through the swing platform 110 and a pinion 118 is affixed to its lower end, the pinion 118 being in mesh with a relatively large swing gear 120 that is fixedly disposed on the upper side of the chassis 102 (see FIGURE 2).

(b) Boom assembly

A reach boom assembly has been designated in its entirety by the reference numeral 200. The boom assembly comprises a main boom 202 and an end or knuckle boom 204 connected together by a pin 206 so as to render the boom assembly articulative. A main boom support in the form of a pair of standards 208 affixed to the swing platform 110 is provided, a pin 210 extending through the one end of the main boom 202 so as to render the main boom 202 pivotal in a vertical plane. In this way, it will be appreciated that the boom assembly 200 swings in unison with the platform 110 and is extensible and retractable in any vertical plane determined by the rotative position of the platform 110. An expansible motor in the form of a cylinder 212 for raising and lowering the main boom 202 has its closed end pivotally connected to the standards 208 through the agency of a pin 214. The cylinder 212 has a piston contained therein and its piston rod 216 extends upwardly so as to engage a portion of the main boom 202 adjacent the free end thereof, a pin 218 serving as the pivotal connection. Consequently, the cylinder 212 when subjected to hydraulic liquid under pressure will raise the main boom 202 into the position depicted in FIGURES 1 and 2. Here again, it should be born in mind that the raising and lowering of the main boom 202 is in a vertical plane determined by the swing platform 110. In order to simplify the drawings as much as possible, the hoses or lines for the cylinder 212 have been omitted and the supply hoses for other cylinders hereinafter referred to have likewise generally not been illustrated. However, certain hydraulic circuitry for controlling the feeding of liquid under pressure to the various cylinders is believed to be novel, as illustrated in FIGURES 22 and 23, and a sufficient number of hoses or lines will be presented in these figures so as to afford a ready comprehesion of these circuits when they are hereinafter described.

At this time, attention is directed to a second expansible motor in the form of a cylinder 220 which actuates the end or knuckle boom 204 relative to the main boom 202. The cylinder 220 for the knuckle boom 204 has its closed end pivotally connected to a point adjacent the free end of the knuckle boom 204 by means of a pin 222. The cylinder 220, as with the previously mentioned cylinder 212, contains a piston and rod 224 which is pivotally connected to a point adjacent the free end of the main boom 202 through the medium of a pin 226.

(c) Boom grapple

Carried at the free end of the boom assembly 200 is a boom grapple labeled generally by the reference numeral 300, the boom grapple 300 comprising a frame 302 which is pivotal in the plane of the boom assembly 200 by virtue of a pin 304. In order to change the attitude of the boom grapple 300 with respect to the knuckle boom 204, there is a cylinder 306 having its closed end pivotally connected to the knuckle boom 204 by a pin 308 and having a piston and rod 310 extending therefrom, the end of the piston rod 310 being connected to the frame by a pin 312.

The boom grapple 300 is illustrated in considerable detail in FIGURES 5, 6, 7 and 8. From these figures, it will be seen that a pair of upper jaws 314, 316 and a pair of similar lower jaws 318, 320 are provided. As best understood from FIGURE 6, the jaw 314 is pivotally mounted on a vertical pin 322, whereas the jaw 316 is pivotally mounted on another vertical pin 324. Likewise, the jaws 318, 320 are pivotally mounted on pins 326, 328, respectively. A cylinder 330 is employed for actuating the jaw 314, an arm portion 332 allowing considerable leverage to be developed. Illustrated in phantom outline is a cylinder 334 for actuating the jaw 316 via an arm portion 336. While the cylinders for the lower jaws 318, 320 are not shown, it will be appreciated that similar cylinders are furnished so these jaws can be actuated at the same time as the upper jaws 314, 316 are operated. The jaws 314–320 and their respective pins 322–328 are mounted on an auxiliary frame 338.

The auxiliary frame 338 and hence the upper and lower pairs of jaws 314–320 are shiftable or swingable about an offset vertical axis provided by a pin 340 carried by the grapple frame 302, the pin 340 journaling the auxiliary frame 338 for such swinging movement. A cylinder 342 having its closed end attached to the frame 302 functions as the expansible motor for achieving the swinging movement of the auxiliary frame 338 having an extensible piston rod 344 which is engaged at its free end (FIGURE 7) with links 346 and 348, the link 346 being pivotally connected at its other end by a pin 350 carried on the frame 302 and the link 348 being pivotally mounted to the auxiliary frame 338 by a pin 352. Consequently, when the piston rod 344 is extended, the jaws 314, 316, 318 and 320 are collectively swung from the position in which they are shown in FIGURES 6 and 7 (also in phantom outline in FIGURE 3) into the solid line position pictured in FIGURE 3. While the reason for swinging the jaws 314–

320 will not be fully understood at the moment, nonetheless a full comprehension of the need for this swinging action will become manifest as the description progresses.

(d) Shear mechanism

Subjacent the boom grapple 300 is a butt shear mechanism identified generally by the reference numeral 400. The shear mechanism 400 is movable in unison with the boom grapple 300, being suspended by a pair of pins 402 and 404 which pass through the lower portion of the boom grapple frame 302 (FIGURE 5). The exemplified shear mechanism 400, as best seen in FIGURE 8, includes a frame 406 having a bottom panel 408 on which are supported cylinders 410 and 412, the closed ends of these cylinders being restrained by vertical pins 414. Each cylinder 410 and 412 has an extensible piston rod 416 to which is attached a clevis 418 and a pin 420 extends through the clevis. The pin 420 also passes through a blade 422 in one instance and a blade 424 in the other instance. The blades are formed with cooperable knife edges 426 that perform the tree-cutting function. It will be understood that the blade 422 is mounted slightly above the blade 424 on a common pin 428 so that there will be no interference when the blades are actuated into a closed or tree-cutting relationship with each other. Also, reinforcing flanges 430 can be employed and these are spaced sufficiently outwardly on the upper surfaces of the blades so as to not introduce any obstruction as the cutting action takes place. The flanges 430 also coactively serve to grip the butt end of the cut tree when the blades 422, 424 have been fully operated through their full cutting arc. The cutting action can be readily effected when hydraulic fluid is introduced into the cylinders 410, 412.

(e) Transfer grapple

Constructed somewhat along the same lines as the previously described boom grapple 300 is a transfer grapple indicated generally by the reference numeral 500. The boom grapple 300, it can be explained, actually delivers a cut tree to the transfer grapple 500. The location of the transfer grapple 500 is best seen in FIGURE 1. However, the showing of this grapple 500 in FIGURE 4 indicates slightly better the structural details thereof and FIGURE 9, along with FIGURES 10 and 11, shows the details even more clearly.

Supporting the transfer grapple 500 are a pair of vertically disposed beams 502 and 504 extending upwardly from a base plate 506 (FIGURE 1) that is secured to the swing platform 110. Clevis-like arms 508, there being an upper and a lower such arm, are integrally attached to the beam 502 at spaced vertical locations thereon. A pair of shafts or large pins 510 is carried by these arms 508 and serves to support a swingable frame 512. A cylinder 514 is utilized for effecting the swinging motion about the pins 510, the closed ends of this cylinder being anchored to the beam 504 by means of a pin 515. The cylinder 514 is equipped with an extensible piston rod 516 that is connected to the frame 512 through a transmission link 517 and a guide link 518. The links 517, 518 are connected at one end to the rod 516 by a pin 519; the other end of the transmission link 517, as seen in FIGURE 11, is connected to the frame 512 through the agency of a pin 520, whereas still another pin 521 connects the other end of the guide link 518 to the beam 502. Consequently, when the piston rod 518 is projected from the cylinder 514, the transfer grapple 500, as its name implies, will provide a transfer movement for a cut tree after it has been delimbed in a manner later described.

The frame 512 carries an upper pair of clamping jaws 522, 524 and a lower pair of clamping jaws 526, 528. Each jaw is pivotally attached to the frame 512 by a pin 530, and each jaw is actuated into its clamping or closed position by a plurality of cylinders. The upper cylinders have been labeled 532 and 534 and can be partially seen in FIGURE 9, but are better seen in FIGURE 10; also from FIGURE 9, it can be seen that lower cylinders 536 and 538 are employed. The closed ends of the cylinders 522–528 are pivotally connected to the frame 512 by means of pins 540 and their extensible rods 542 are pivotally connected to the jaws 522–528 by additional pins 544, one such pin being visible in FIGURE 10 where a portion of the frame 512 has been broken away and the two lower pins 544 being presented in phantom outline in FIGURE 11.

(f) Delimbing means

The reference numeral 600 has been assigned to the delimbing means which includes an upstanding mast 602 that need not be referred to in detail other than to mention that it would be sufficiently high to accommodate the tallest tree to be harvested—50 feet, if the trees are approximately 55 to 65 feet tall. Since it is desired, though, that the mast 602 be as lightweight as possible, it is composed of a plurality of vertical members 604 and angularly arranged braces 606, thereby rendering the interior hollow. Extending upwardly along the forward side of the mast is a track 608 along which is guided in a rectilinear upward path a cutter or delimbing head 610 having contractible curved blades 612, 614 formed with an upwardly directed cutting edge 616. Actually these blades 612, 614 can be quite similar to those disclosed in United States Patent No. 3,183,949 granted May 18, 1965, to Robert W. Larson, one of the present inventors, and assigned to the same assignee as the present application. The referred-to patent is concerned with blades that are resiliently contractible, thereby differing appreciably from the manner in which our blades 612, 614 are actuated. Instead of springs, we employ a unique self-contained hydraulic circuit which will be described later.

As can be discerned from FIGURES 12 and 22, each curved blade 612, 614 is provided with a clevis-like arm or ear unit 618. A pin 620 extends through each of these arm units 618 and connects with the projecting end of a piston rod 622 slidably received in a cylinder, there being two such cylinders 624 and 626 inasmuch as the cylinder 624 operates the curved blade 612 and the other cylinder 626 operates the other curved blade 614. For the time being, it will merely be mentioned that as the diameter of the tree being climbed diminishes, the curved blades 612 and 614 are continually moved inwardly so as to follow the reduction in tree size.

For the purpose of swiftly raising the cutter or delimbing head 610 in order to effect the delimbing of the branches by impact shearing or cleavage, the head is pulled very rapidly up along the mast 602 as guided by the track 608. Accordingly, a pulley 628 (FIGURES 1 and 2) is rotatably disposed at the top of the mast 602 and a second pulley 630 (FIGURE 4) is similarly rotatably disposed at the bottom of the mast 602. Entrained about these pulleys 628 and 630 is a cable 632, the ends of the cable being connected to the head 610 in a manner hereinafter referred to. Within the confines of the mast 602 is an auxiliary track 634 (FIGURE 4) which longitudinally guides a sheave mechanism or motion multiplying device 636, there being a plurality of small wheels 638 that ride against each side of the track 634 so as to be guided thereby. It will be understood that the series of pulleys or sheaves, collectively labeled 640 included in the sheave mechanism 636, will provide an extremely large movement of the cutter head 610 for a limited amount of movement imparted to the sheave mechanism 636. If further description is desired in connection with the sheave mechanism 636, resort can be made to United States Patent No. 3,252,487 issued on May 24, 1966 to Robert W. Larson et al. and assigned to the same assignee as the present application; the alluded-to device is pictured in FIGURE 9 of this patent.

In order to raise and lower the sheave mechanism 636, a cylinder 642 is employed, its projectable and retractable piston rod being designated by the numeral 644. The closed or upper end of the cylinder 642 is connected to the mast 602 at 646. Consequently, whenever the piston rod 644 is urged downwardly by hydraulic fluid, then the sheave mechanism 636 will swiftly pull the delimbing head 610 upwardly in the direction of arrow 648 shown in FIGURE 4.

(g) Topping mechanism

The topping mechanism, which has been given the reference numeral 700, is closely allied with the delimbing means 600 that has just been described. As a matter of fact, the cutter or delimbing head 610 contains the parts comprising the topping mechanism 700. FIGURES 12, 13, 14, 15 and 22 portray the topping mechanism and it will be perceived that this mechanism includes a pair of flat blades 702 and 704 which are pivotally mounted on parallel axes furnished by a pair of spaced pins 706 anchored to a portion of the cutter head 610. Each blade 702, 704 has a straight knife edge 708. From FIGURE 15, it will be discerned that the pivotal mounting of the blades 702 and 704 allows them to be rotated in the direction of the arrows 710 and 712 to perform the topping operation. The position shown in phantom outline illustrates the blades 702 and 704 fully operated in a topping direction.

In order that the blades 702 and 704 will be rotated in unison toward each other, a short lever arm 714 is provided in association with each blade 702 and 704, the lever arms 714 being interconnected with a link 716 having a pin 718 at each end which connects the lever arms 714 together and results in the rotation as indicated by the arrows 710, 712 depicted in FIGURE 15.

Although that portion of the hydraulic circuitry for the over-all apparatus that is believed novel will be described hereinafter, the hydraulic circuitry for the topping mechanism is completely independent of the other hydraulic circuitry and is thought to be sufficiently unique and important to warrant a separate description. Accordingly, it is believed helpful to describe the self-contained hydraulic circuitry associated with the actuation of the topping mechanism 700 at this stage. While it has heretofore been stated that the cable 632 entrained about the pulleys 628 and 630 is connected to the upper and lower sides of the delimbing head 610, this, strictly speaking, is an incomplete story. More precisely, the cable 632 is connected at the upper side of the delimbing head 610 to an upwardly projecting piston rod 718 and the other end of the cable 632 is similarly connected to a downwardly projecting piston rod 720. The piston rods 718 and 720 are in reality a single rod having a piston 722 (shown in dotted outline in FIGURE 22) located intermediate its ends. The piston 722 is slidably contained in a cylinder 724 and this cylinder is shown in FIGURES 12 and 15 but more clearly in FIGURE 22. FIGURE 22 is of advantage because it shows the cylinder 724 in an exposed or detached relationship from the structure comprising the delimbing head 610 itself.

Before describing the structure for actuating the topping mechanism 700, it will be well to consider the manner in which the delimbing blades 612 and 614 are actuated. FIGURE 22 illustrates a tube 726 coming from the lower portion the cylinder 724. The tube 726 leads to a first T connection 728 which is connected to a downwardly extending tube 730 which leads into a second T 732 having a pair of tubes 734 and 736 extending therefrom to the closed ends of the previously-mentioned cylinders 624, 626 associated with the delimbing blades 612, 614 of the delimbing means 600. Additional tubes 738, 740 connect with the closed ends of the cylinders 624, 626 and are joined together by a third T 742 having a tube 744 leading upwardly to an accumulator 746.

Returning now to a continued discussion of the topping mechanism 700 and the hydraulic circuitry associated therewith, it is to be noted that a tube 748 extends upwardly from the T connection 728 and that this tube 748 connects with the closed end of a cylinder 750 having a piston rod 752 extending therefrom. It is this piston rod 752 that connects with the lever arm 714 that is integral with the blade 702 and the link 716 mechanically couples the movement of this blade to the other blade 704 so that the blades will be moved in the direction denoted by the arrows 710, 712 superimposed upon FIGURE 15. The end of the cylinder 750 from which the piston rod 752 projects has a tube 754 leading to a normally closed valve 756 provided with a plunger 758 having a roller 760 carried thereon which is actuated by a cam finger 756 (FIGURE 13) when the delimbing blades 612, 614 have reached a predetermined degree of contraction due to the diminution in tree size at an elevation where the delimbing has been completed. It will be remembered that the delimbing blades 612, 614 follow the diameter of the tree during the delimbing action. The finger 762 shown in FIGURE 13 merely moves in a clockwise direction with the blade 614 and then strikes the roller 760 carried at the exposed end of the plunger 758 when the blade 614 has moved sufficiently inward, the inward position typically representing a tree portion having a three inch diameter. This opens the valve 756. Leading downwardly from the valve 756 is a vertical tube 764 which has communication at its lower end with an accumulator 766.

It will be recognized that as the cable 632 is pulled downwardly, the piston rod 720 that projects from the lower end of the cylinder 724 will be pulled downwardly, thereby producing an increased pressure under the piston 722. This forces hydraulic fluid into the cylinders 624 and 626, through the tubes 726, 730, 734 and 736, as well as into the cylinder 750 via the tube 748. There is no valve between the cylinders 624 and 626 and the cylinder so that the delimber blades 612, 614 will continually be drawn outwardly away from the tree that has been delimbed. A vent 768 in the cylinder 724 above the piston 722 allows the entrance of air as the piston 722 moves downwardly and escape of air as the piston 722 moves upwardly during the ascent of the delimbing head 610. From this information it will be seen that the accumulators 746 and 766 will store energy as the piston rod 720 is pulled downwardly during the descent of the head 610, for this causes fluid to be forced from the cylinders 624 and 626 through the tubes 738 and 740 into the accumulator 746 via the tube 744, and also into the accumulator 766 through the tubes 754 and 764 while the valve 756 is open.

Having assumed a lowering of the delimbing head 610 which automatically resulted in a recharging of the accumulators 746 and 766, the latter recharging until the valve 756 closes. It will be appreciated that where the cable 632 is pulled upwardly to perform a delimbing operation, the piston rod 718 is pulled upwardly along with the piston 722. This allows the accumulator 746 to discharge its stored energy through the tubes 744, 738 and 740 into the closed ends of the cylinders 624 and 626 with the consequence that the blades 612 and 614 are actuated inwardly to perform their delimbing function as the head 610 moves upwardly.

However, when the cam finger 762 strikes the roller 760 on the end of the plunger 758 when the blade 614 has moved sufficiently inward during the upward travel of the head 610, the valve 756 will open so as to allow liquid stored in the accumulator 746 to flow upwardly through the valve 756 that has been closed up to this point into the left end of the cylinder 750. The pressure, of course, forces fluid under these conditions into the left end of the cylinder 750. By reason of this, the piston rod 752 is pulled inwardly. Since the free end of the rod 752 is connected to the lever arm 714 associated with the topping blade 702, the other topping blade 704 is actuated in unison, although in an opposite rotative direction, because of the link 718 and the fact that the lever arm 714 associated with the second topping blade 704 is 180° from the one to which the piston rod 752 is connected. All that has to occur is that the topping blades 702, 704 move slightly inwardly in the direction of the arrows 710, 712 applied to FIGURE 15. This is the situation because the sharpened edges 708 on the topping blades 702, 704 dig into the tree and further upward pull of the delimbing head 610 will cause further skiving or cleaving without assistance from the piston rod 752. In other words, it is just an initial amount of rotative movement of the topping blades 702, 704 in order to effect a complete cleavage and topping of the tree after it has been delimbed by the delimbing blades 612 and 614.

It perhaps should be explained again that the vent 768 allows air to escape from the upper portion of the cylinder 724 when the delimbing means is being raised, but when there is a downward pull exerted on the cable 632 which pulls the piston 722 downwardly, inasmuch as the cable is then acting upon the lower piston rod 720, air is drawn back into the upper portion of the cylinder 724 via this vent 768. The accumulators 746 and 766 will continually be recharged during each subsequent descent, the latter accumulator until the blades 612, 614 have opened enough to allow the valve 756 to reclose, more specifically the blade 614 causing its finger 762 to return to the solid line position in FIGURE 13.

(h) Collector

Denoted in its entirety by the reference numeral 800 is a collector. As its name suggests, the function of the collector 800 is to collect or accumulate the trees after they have been delimbed and topped. It is the role of the transfer grapple 500 to swing the delimbed and topped trees in a direction so that the collector 800 can receive them. While the collector 800 is generally illustrated in FIGURES 1 and 3, it is pictured in considerable detail in FIGURES 16-21. The collector 800 includes a base frame 802 affixed directly to the deck or swing platform 110. Pivotally tiltably connected to the base frame 802 in a way soon to be described is a bundle support frame 804. From FIGURES 1-3, these figures showing the frame 804 in a vertical position, and from FIGURES 20 and 21, these figures showing the frame 804 in a horizontal or tilted position, one can see that the frame 804 is generally U-shaped. To facilitate the ensuing description, one side of the frame 804 has been given the reference numeral 806, the other side which is parallel thereto the reference numeral 808, the closed end the reference numeral 810, and the other end, which can be opened, the reference numeral 812. Integral with the bottom of the frame 804 is a floor panel 814. While the end 812, which functions as an entranceway for the delimbed trees, has been described as being capable of being opened, it is usually kept closed with special one-way structure and is really only open when the trees are to be dumped or unloaded.

Normally closing the opening or entranceway 812 into the collector 800 are unloader arms 816 and 818 mounted at the side 806. The upper arm 816 is rendered pivotal by means of a pin 820 and the lower arm 818 is made pivotal by a shaft 822. Each of the arms 816 and 818 is actuated by a hydraulic cylinder, the cylinder for the upper arm 816 being labeled 824 and the cylinder for the lower arm 818 being identified by the number 826. Each cylinder 824, 826 has a piston rod 828 retractable therein which is connected at its free end to its respective arm 816, 818 by a pin 830. The closed ends of the upper and lower cylinders 822, 824 are mounted directly to the side 806 of the frame 804, being attached thereto by means of a pin 832 in each situation.

The arms 816 and 818 are each provided with a gate 834, the gates being pivotally carried at the end of their associated arms 816, 818 by pins 836. The gates 834 are normally urged or biased into a closed or blocking position by a coil spring 838, one for each gate, that has one end thereof connected to one end of the gate it is to bias and the other end thereof anchored to the particular arm 816, 818 that it is mounted on.

Additional gates 840 are located on the side 810 of the frame 806, a pin 842 serving as the means for supporting these gates in a pivotal relationship with the frame side 808. Unlike the gates 834 at the first side 806 of the frame 804, the gates 840 in this situation are not carried on arms corresponding to the swingable arms 816, 818. However, the gates 840 are each normally biased into closed position by means of a coil spring 844, there being one for the upper gate and one for the lower gate. It will be appreciated that portions of the gates 834 abut the arms 816, 818 to prevent them from opening outwardly, the springs 838 yielding or stretching to allow them to open inwardly when pressed by a tree-length log; likewise, the gates 840 abut portions of the frame side 810 but are yieldable inwardly by virtue of the springs 844.

Intermediate the upper and lower gates 840 is a first push-in arm unit 846 that is swung on a shaft 847 in the direction of the gates 840 so as to shove a cut tree against the gates 840, as well as the gates 834, and thus help shift a tree from the transfer grapple 500 into the collector 800 when the transfer grapple has been swung into a tree-releasing position relative to the collector 800. The push-in arm unit 846 is preferably operated by means of upper and lower cylinders 848 connected at their closed ends to the side 808 of the frame 804 and each having a piston rod 850 that is connected to projections 852 integral with the push-in arm unit so that when the piston rods 852 are extended, then the push-in arm unit 846 is rotated in the proper direction to shove the delimbed tree past the yieldable gates 834 and 840. To maintain each entering tree vertical, a second or lower push-in arm unit has been found necessary, being mounted on the lower unloader arm 818 and thus swingable inwardly from the frame side 808 in order not to interfere with the movement of the transfer grapple 500. The second push-in arm unit is actuated in the same fashion as the arm 846 so it really is not necessary to describe its cylinder and piston. It is the function of the push-in arm unit 846 (and its lower unpictured counterpart) to dislodge the delimbed tree from the transfer grapple 500 and as their names imply to push into the collector 800 each successive tree.

For the purpose of holding the successively received trees upright within the collector 800, there is a restraining mechanism 856 disposed in the space inside the collector that is somewhat visible in FIGURE 1 but which is best seen and understood in FIGURES 17, 18, although this mechanism is also visible in FIGURES 4, 16, 19, 20 and 21. A lower transverse bar 858 is integral with a link member 860, the two elements forming a T-shaped configuration when viewed from above (although visible to a certain extent in FIGURE 1). Whereas, the transverse bar 858 is mounted at the lower end of the link member 860, the upper end of the link member 860 is pivotally mounted on a shaft 862 extending between the sides 806, 808 of the frame 804. An upper transverse bar 864 is integral with a second link member 866 and results in a T-shaped configuration that can be easily seen in FIGURES 3, 20 and 21 (and to a certain extent in FIGURE 1), the second link member 866 being pivotally connected to the first link member 860 at 868. When the transverse bars 858 and 864 are forward, this being the position they assume when the first tree is to be delivered to the collector 800, the link members 860, 866 form a modified X as can be discerned from an inspection of FIGURE 17. However, the link member 866 is shorter than the link member 860 and thus a true X does not exist. The end of the second link member 866 has pivotally connected thereto at 870 a guide link member 872 which is pivotally connected to the frame end 810 at 874. The biasing of the transverse bars 858 and 864 into a forward position, this being the position pictured in FIGURE 17, is achieved with a cylinder 876 having its closed end pivoted to the frame end 810 at 878 and having its piston rod 880 pivotally connected to the first link member 860 at 882.

With the cylinder arrangement envisaged by the present invention in effect, the incoming trees act against the transverse bars 858, 864 so as to merely push these bars back to whatever extent is needed in order to accommodate additional trees within the collector 800. Although not illustrated, a relief valve is connected in the hydraulic circuitry associated with the cylinder 876 and the pushing back causes the hydraulic fluid to be forced outwardly via such relief valve. In other words, the envisioned arrangement provides a form of automatic cushioning, somewhat like a shock absorber functions. The action is automatic so the operator is relieved of having to devote any attention whatsoever to the operation of the restraining mechanism 856.

When the collector 800 becomes full or when no further trees are to be accumulated therein, it is contemplated that the upper or bundle supporting frame 804 be pivoted from its vertical or tree-receiving position into a horizontal or dumping position. The vertical position is illustrated in several views, particularly FIGURES 16, 17 and 18 and FIGURES 19, 20 and 21 illustrate the frame 804 after it has been tilted into the horizontal or dumping position. It will be perhaps easiest to concentrate on FIGURES 16 and 19. It will be observed from these two figures that the base frame 802 has a pair of pivot pins 884 mounted thereon, there being one at each side of the frame 804. In FIGURE 16, this representing the collector 800 when still vertical, there is a rearwardly inclining arm 886 that has a pin 888 at its upper end which passes into the upper frame 804 which is to be tilted. Here again, there is a second such pin 888 on the other side of the collector 800. For the purpose of tilting the collector, a cylinder 890 is utilized, having its closed end pivoted by a pin 892 to the lower or base frame 802. A piston rod 894 is fully retracted as shown in FIGURE 16 but is pivotally attached by a pin 895 to an intermediate portion of the angularly disposed arm 886. Hence when the piston rod 894, there actually being one at each side of the collector 800, is extended, both arms 886 are caused to pivot about their lower pins 886 and the upper frame 806 is rotated or tilted into the position illustrated in FIGURE 19. From FIGURE 19, the parts that are tilted with the frame 804 are clearly identifiable.

One refinement built into the collector 800 that has not been mentioned at this point is the ability to change the attitude of the upper frame 804 after it has been tilted. This is accomplished by reason of a pair of cylinders 896 having their closed ends pivotally connected at 897 to an intermediate portion of the arms 886 but on the forward sides of these arms in contradistinction to the pivotal connection of the piston rods 880 to the rearward sides. The cylinders 896 have piston rods 898 whose free ends are pivotally connected at 899 to the forward and lower corners of the upper frame 804. In this way, it being recognized that the cut and delimbed trees can be of substantial length, the upper frame 806 when tilted can be held horizontal so as to prevent the projecting end of the delimbed trees that are held in the collector 800 from striking the ground which is most likely to happen where the terrain is uneven or hilly. In other words, the upper frame 804 can be angularly adjusted to whatever degree, whether horizontally or at an inclination, with the ground that best meets the encountered conditions.

Obviously, the arms 816 and 818, as well as the gates 834 and 840, remain closed during the tilting action, but since the gates 834 are carried on the upper and lower arms 816, 818, actuation of the piston rods 828 to swing these arms 816, 818 so as to open the gates 834 mounted thereon will allow the cut and delimbed trees to gravitationally fall onto the ground. Of course, the push-in arm unit 846 is first retracted by way of its actuating cylinders 848 so no interference exists with respect to the dumping of the trees. This holds true with the lower undisclosed push-in arm unit, too.

(i) Hydraulic and electrical circuitry

Although one hydraulic circuit has been described in conjunction with FIGURE 22, that circuit is separate and distinct from the circuit diagrammed in FIGURE 23. The circuitry in FIGURE 23 deals with both hydraulic and electrical features and has been designated generally by the reference numeral 900. It will be assumed that the main boom 202 of the boom assembly 200 has been retracted so that the boom grapple 300 is in readiness to place a cut tree, although not yet delimbed, in the transfer grapple 500. A throttle valve TV1, when open, supplies fluid under pressure from a pump P1 through a hose or line 902 to the cylinders 330 and causes the jaws 314, 316 of the boom grapple 300 to assume a gripping relationship with the tree to be delivered to the transfer grapple 500.

Although the cylinders 410, 412 of the butt shear 400 do not appear in FIGURE 23, it will be pointed out that in practice these shear cylinders are connected in parallel via a line 904 with the cylinders 330 and thus operate when the cylinders 330 operate (and also when the cylinders for the jaws 318 and 320 operate). This operation is a manual one under the control of the valve TV1 which is manipulated by the operator.

Next to be referred to is a solenoid valve SV2 that is connected to a pump P2. A line 914 leads to the cylinder 342 so as to cause the auxiliary frame 338 of the boom grapple 300 to swing about the pin 340 when the valve SV2 is open. The solenoid valve SV2 is energized by means of a relay 1CR having a coil in circuit with a pushbutton switch PB1. The relay 1CR has a set of normally open contacts 1CR1. Hence, when the pushbutton switch PB1 is closed, the relay 1CR picks up the contacts 1CR1 and the solenoid valve SV2 is in this way opened so as to introduce fluid into the cylinder 342 and cause the boom grapple 300 to rotate, more specifically its auxiliary frame 338 to swing toward the transfer grapple 500. It will be observed that the pushbutton switch PB1, which is of course in the cab 112, must be held closed by the operator during this portion of the operation of the apparatus. Likewise, the switch 904 that energizes the solenoid valve SV1 is also left closed so as to assure that the tree being delivered to the transfer grapple 500 will be securely held during its travel.

Next to be referred to is a relay 2CR having two sets of normally open contacts 2CR1 and 2CR2. The contacts 2CR2 are in circuit with a solenoid valve SV3 that receives liquid from a pump P3. The solenoid valve SV3 in turn supplies liquid to a line 916 which branches into lines 916a and 916b. The line 916a has a check valve CKV therein. Also, it will be observed that the line 916a connects with the cylinders 532, 534 which actuate the jaws 522, 524 of the transfer grapple 500. The line 916b connects with the upper end of the delimbing cylinder 642 but has contained therein a sequence valve SQV1 that delays the introduction of fluid into the cylinder 642 until after the jaws 522, 524 of the transfer grapple 500 have been firmly closed on the tree that has been delivered thereto by the boom grapple 300.

Another relay 3CR has normally open contacts 3CR1 and 3CR2 plus a set of normally closed contacts 3CR3. The normally closed contacts 3CR3 are in circuit with the contacts 2CR1 which serve to seal in the relay 2CR once a pushbutton switch PB2, also located in the cab 112, has been depressed. The normally open contacts 3CR1 are connected to one side of the pushbutton switch PB2 and the other side of these contacts 3CR1 are connected in circuit with a limit switch LS1. The limit switch LS1 is normally open but is closed when the delimbing head 610 has been fully raised, this being when the sheave or motion multiplying mechanism 836 has reached the deck or surface of the swing platform 110. It will be remembered that the sheave mechanism 636 moves downwardly in producing its motion multiplication which results in the delimbing head 610 being pulled rapidly upwardly. The normally open contacts 3CR2 are in circuit when a solenoid valve SV4 that receives liquid from a pump P4. The solenoid valve SV4 is connected to the cylinder 514 that produces the swinging of the transfer grapple 500, more specifically its frame 512, via a line 918. At the same time, the contacts 3CR3 are opened, thereby de-energizing the solenoid valve SV3 but due to the presence of the check valve CKV in the line 916a, the fluid in the cylinders 532, 534 remains trapped therein and the gripping action provided by the jaws 522, 524 is maintained during the swinging of the transfer grapple 500. It will be appreciated that at this stage the tree has been delimbed inasmuch as the delimbing head 610 has been pulled upwardly as a result of fluid having been supplied through the sequence valve SQV1 to the cylinder 642 which has forced the sheave mechanism 636 downwardly.

A limit switch LS2 is located so as to be engaged by the transfer grapple 500 after it has swung the now delimbed tree to the collector 800 through an arc indicated by the numeral 920. A relay 4CR is in circuit with the limit switch LS2 and also is in circuit with a pressure switch PS. The pressure switch PS will be further described below but at this time it should be observed that it includes a set of normally closed contacts PS1, thereby allowing a circuit to be completed through the coil of the relay 4CR when the limit switch LS2 is closed. The relay 4CR has normally open contacts 4CR1 and 4CR2 as well as normally closed contacts 4CR3. Once the relay coil 4CR has been energized due to the closure of the limit switch LS2, the closing of the normally open contacts 4CR1 assures an electrical path through these contacts and the contacts PS1 of the previously mentioned pressure switch PS.

However, when the relay 4CR is energized, it picks up or closes its contacts 4CR2 which supplies energy to a solenoid valve SV5 connected to the line 916a so as to drain fluid from the cylinders 532, 534. At the same time, the contacts 4CR2 energize a solenoid valve SV6 receiving fluid under pressure from a pump P6. The valve SV6 connects with a line 922 that branches into lines 922a and 922b. The line 922a connects with the opposite ends of the cylinders 532, 534, from which the line 916a connects so that the jaws 522, 524 are actuated in a reverse direction to release the tree. The line 922b goes to the upper end of the cylinder 642 which causes the sheave mechanism 636 to be raised with the result that the delimbing head 610 is moved downwardly in preparation for the next delimbing operation. The line 922b has a branch line 922c leading to the cylinders 848 of the collector 800 has a sequencing valve SQV2 interposed therein so that shortly after the delimbing head 610 starts on its downward descent, the cylinders 848 then receive fluid under pressure so as to cause the push-in arm unit 846 to shove the tree that has been transferred by the grapple 500 against the gates 834 and 840.

Still another branch line 922d is in circuit with the previously mentioned pressure switch PS. Thus, the cylinder 514 receives fluid when the sequence valve SQV2 opens and fluid is also introduced into the cylinder 514 at the opposite end thereof from that introduced by way of the line 918. The transfer grapple 500, nonetheless, is actuated through the arc 920 in a reverse direction to return the grapple 500 to the position that it was in when it received a tree from the boom grapple 300.

As the transfer grapple 500 returns, it will be appreciated that there is a build-up of pressure in the branch line 922d which causes the pressure switch PS to ultimately open its contacts PS1 so that the circuit to the relay 4CR is broken with the consequence that its contacts 4CR1 and 4CR2 are opened and its contacts 4CR3 are closed. However, closing of the contacts 4CR3 does not start a new transfer cycle until the pushbutton switch PB2 has been closed again. Thus, everything at this point is in readiness for the processing of another cut tree when delivered from the boom grapple 300 to the transfer grapple 500.

Every effort has been made to present a simplified hydraulic and electric circuit 900. A considerable amount of additional valving is used in practice to assure a return of the various components constituting the exemplified high-speed harvester to their respective starting or initial positions. For instance, the means for supplying liquid to the other ends of the cylinders 330 and the cylinder 342 has not been shown. Likewise, the circuitry associated with other cylinders not appearing in FIGURE 23 but in other figures in portraying the apparatus has not been described. Nonetheless, it is believed that the diagram constituting FIGURE 23 is ample to illustrate the basic functioning of our high-speed harvester, particularly when taken in conjunction with the ensuing operation.

(j) Operation

Having presented the foregoing information, the manner in which our apparatus operates is believed readily apparent. However, a brief operational sequence should prove of benefit in appreciating the various advantages to be derived from a practicing of the invention.

First, the vehicle 100 is propelled by means of its endless tracks 108 to the outer perimeter of the standing wood that is to be harvested. While only one tree has been depicted in FIGURE 1, it will be appreciated that a number of such trees will exist. Thus, the apparatus is intended to function in a progressive series of circular sectors, starting from a position somewhat similar to that pictured in FIGURE 1 but with the swing platform 110 usually turned more counterclockwise than that actually shown.

With the vehicle 100 in its initial relationship with the trees to be harvested, the boom assembly 200 will normally already be in its minimum reach position, approximating the reach position illustrated in FIGURES 1 and 2. It will be appreciated that the controls (not shown) for adjusting the main boom 202 and the knuckle boom 204 are located in the cab 112 and that when fluid under pressure enters the appropriate ends of the cylinders 212 and 220 the appropriate reach position can easily be realized.

The jaws 314–320 of the boom grapple 300 are opened by introducing fluid into the cylinders 330. Also, the blades 422, 424 of the shear mechanism 400 are apart, as illustrated in FIGURE 8, being separated through the agency of the cylinders 410, 412 which are in parallel with the cylinders 330. With the boom grapple 300 and the underlying shear mechanism 400 in condition to accommodate the tree labeled T1, the boom assembly can be extended slightly to crowd the tree. If needed, the attitude of the frame 302 can be angularly adjusted via the cylinder 306 and piston rod 310.

When the valve TV1 is operated to close the jaws 314–320, the shear blades 422, 424 are at the same time forced toward each other so as to cause the knife edges 426 to shear the tree T1 and thus sever it from its rooted trunk. The boom assembly 200 is retracted and elevated so as to bring the boom grapple 300, the shear mechanism 400 and the tree to the level of the platform 110, the tree being designated as T2 at this location in FIGURE 3.

The boom grapple 300, more specifically the auxiliary frame 338 of this grapple, is then in readiness to be swung so as to deliver the cut tree T2 to the transfer grapple 500. The arcuate path through which the tree T2 is moved has been designated by the arrow 1000. To achieve this swinging movement, the operator must close pushbutton switch PB1 and hold this switch closed during the shifting of the tree T2 through the path 1000. The pushbutton switch PB1 must be held closed during the arcuate delivery of the tree T2 via the path 1000 (FIGURE 3) to the transfer grapple 500. From FIGURE 23, it will be discerned that the contacts 1CR1 are at this time closed so as to energize the solenoid valve SV2 which supplies hydraulic fluid to the cylinder 342 via the line 914.

Since at this moment the jaws 522–528 of the transfer grapple 500 are open, the jaws 314–320 of the boom grapple 300 being in a vertically staggered relationship with the jaws 522–528 of the transfer grapple 500, the tree T2 is delivered to the station at which the delimbing action is to take place. Since the tree has been shifted, the tree at the new location has been given the designation T3. While provision is made for introducing fluid under pressure into the opposite ends of the cylinders 330, the drawing can be made more simple by omitting such supply means. However, directing fluid into the other ends of the cylinders 330 causes the jaws 314–320 of the boom grapple 300 to open and thereby release the tree T3 to the transfer grapple 500.

The next step involves the closing of the pushbutton switch PB2. This establishes an electrical path through the normally closed contacts 4CR3, the normally closed contacts 3CR3 and the coil of the relay 2CR. The picking up of the relay 2CR closes its normally open contacts 2CR1 so as to seal in this relay and thereby obviate the necessity of keeping the pushbutton switch PB2 closed. Also, the energization of the relay 2CR closes its contacts 2CR2 so that the solenoid valve SV3 is opened which supplies fluid through the line 916 into the branch line 916a and thence into the cylinders 534 which actuate the jaws 522–528 of the transfer grapple 500 into their closed or gripping relationship with the tree T3.

It is important to appreciate that once the pushbutton switch PB2 is depressed, the operator no longer has to pay any attention whatsoever to the further processing of the tree T3 from this point on. There is a decided advantage in allowing the operator to then select a second standing tree with the boom assembly 200 and the boom grapple 300 and the shearing mechanism 400 mounted immediately thereunder. In other words, the second tree which will correspond to the trees T1 can be gripped and cut while the tree T3 is being processed, thereby more fully utilizing the overall harvesting apparatus.

Now that the tree T3 is securely gripped by the transfer grapple 500, the delimbing action itself can be accomplished. In order to postpone the actuation of the delimbing head 610 until the tree T3 has been securely gripped by the jaws 522–528 of the transfer grapple 500, a sequence valve SQV1 which is in the branch line 916b delays the supply of liquid under pressure to the cylinder 642 that moves the sheave mechanism 636 downwardly to raise the delimbing head 610 via the cable 632.

It will be recalled that the topping mechanism 700 is carried directly on the delimbing head 610 and moves in unison therewith. Attention should now be devoted to FIGURE 22 and also to FIGURE 13 where the cam finger 756 is visible. It will be appreciated that as the delimbing head 610 moves upwardly along the mast 602, the arcuate blades 612, 614 are progressively urged inwardly as the diameter of the tree being delimbed diminishes, being constrained to do so by hydraulic action. Since a tensile pull is exerted on the cable 632, it will be seen from FIGURE 22 that the piston rod 718 is pulled upwardly and that this causes the piston 722 to produce a region of reduced pressure therebeneath so as to allow the energy stored in the accumulator 746 to become effective in moving the blades 612, 614 inwardly against the tree being delimbed. The hydraulic circuit can easily be traced via the lines or tubes 726, 730 and 734 to one of each of the cylinders 624 and 626. This results in the piston rods 622 being urged outwardly by the fluid stored in the accumulator 746 with the consequence that the arms 618 on each of the blades 612 and 614 are moved so as to pivot the blades 612, 614 inwardly to accomplish the delimbing function.

When the delimbing head 610 has reached an elevation such that the size of the tree has decreased to, say, three inches in diameter, the cam finger 756 strikes the roller 760 so as to force the plunger 758 inwardly to open the valve 756. This completes the hydraulic circuit between the lower portion of the cylinder 724 and the accumulator 766 so that the fluid energy therein is applied to the cylinder 750 with the result that the piston rod 752 is drawn inwardly. Since the free end of the piston rod 752 is connected to the arm 714 through the medium of the link 716, the topping blades 702, 704 are pivoted inwardly toward each other and their knife edges 708 (FIGURES 12 and 15) dig into the tree and slice off the top of the tree T3 so as to leave only the tree-length log therebeneath.

As the delimbing head 612 travels upwardly, the sheave mechanism 636 moves downwardly and when it reaches the deck level of the platform 110, a normally open limit switch LS1 is closed. This limit switch LS1 appears in FIGURE 4 and also in FIGURE 23. Closure of the limit switch LS1 completes a circuit through the still closed contacts 4CR3 of the relay 4CR and through the coil of the relay 3CR with the consequence that the relay 3CR picks up and closes its contacts 3CR2. The contacts 3CR2, it can be seen, are in circuit with the solenoid valve SV4 so the valve SV4 then introduces liquid via the line 918 into the cylinder 514 which causes the transfer grapple 500, more precisely its auxiliary frame 512, to swing about the vertical axis provided by the vertically arrayed shafts or pins 510, the arcuate path being denoted by the arrow 1002. The contacts 3CR3 are also opened to de-energize the solenoid valve SV3, but the check valve CKV keeps fluid trapped in the cylinders 532, 534 so that the jaws 522–528 remain closed, the valve SV5 blocking drainage from these cylinders at this point.

As the frame 512 of the transfer grapple 500 swings, the frame will traverse the previously-referred-to path designated by the arrow 920, striking the normally open limit switch LS2 when the tree has been transferred to the opening 812 of the collector 800. The tree at this point has been labeled T4 as can be discerned from FIGURE 3.

The closing of the limit switch LS2 establishes an electrical circuit through the coil of relay 4CR because the contacts PS1 of the pressure switch PS are normally closed and are still closed at this time. When the relay 4CR picks up, it closes its contacts 4CR1 so as to seal in or hold in the relay 4CR. At the same time, closure of the contacts 4CR2 will energize the solenoid valve SV6 to supply liquid through the line 922. The line 922 branches into line 922a which introduces fluid at the opposite ends of the cylinders 532, 534 from that supplied by the branch line 916a. Simultaneously with this happening is the energization of the solenoid valve SV5 by virtue of the closing of contacts 4CR2. This results in the jaws 522–528 of the transfer grapple 500 opening so as to release the tree T4. Even though the solenoid valve SV3 closed when the relay 3CR became energized, the check valve CKV retained the fluid in the cylinders 532, 534 so as to maintain a grip on the tree during the transfer thereof. However, opening of the valve SV5 allows liquid to drain so that the liquid entering the other ends of the cylinders 532, 534 via the branch line 922a is effective to assure that the jaws 522–528 of the transfer grapple 500 are urged into a fully open relationship which releases the tree that has been held up to this point. Concomitantly with this occurrence is the flowing of liquid through the branch line 922b to the upper end of the cylinder 642. This results in the piston rod 644 being pulled upwardly into the cylinder 642 which raises the sheave or motion multiplying mechanism 636 and at the same time pulls the delimbing head 610 downwardly because of the downward pull on the cable 630.

Sequence valve SQV2 is in the branch line 922c which is also supplied with liquid at the same time the solenoid valve SV6 is opened. The sequence valve SQV2 delivers liquid, after a brief delay, to the cylinders 848 that actuate the push-in arm unit 846 in a direction to shave the tree T4 against the spring-biased gates 834 and 840. These gates 834, 840 yield so the tree T4 is moved into the frame 804.

From what has been described above, the first tree has now been received by the collector 800 and has been given the reference designation T5. The tree T5 as it moves inwardly appears in FIGURE 17 and it will be noted that the restraining mechanism 856 has its transverse bars 864, 858 in a forwardly disposed position so the incoming tree T5 bears thereagainst. As already explained, the role played by the restraining mechanism 856 is to keep the trees upright as they enter the collector 800. A sufficient number of trees T5 has been shown in FIGURE 18 and this results in a compressing or collapsing of the restraining mechanism 856, the piston rod 880 moving farther into the cylinder 876. It has already been pointed out that there is a relief valve (not shown) which allows the fluid to be forced out of the cylinder 876. At any rate, it is readily apparent that the restraining mechanism 856 provides a cushioning action that keeps the trees T5 upright within the collector 800 irrespective of the number of trees that have been accumulated. Without the restraining mechanism 856, the trees T5 would be allowed to tilt and the capacity of the collector 800 would be considerably reduced.

While the sequence valve SQV2 supplies fluid to the cylinders 848 to push in the tree T5 that is being transferred to the collector 800, there is an additional branch line 922d which supplies fluid to the other end of the cylinder 514 from that which is supplied by the line 918, the pressure switch PS being contained in this line. As the pressure builds up, the pressure switch PS is actuated so as to open its contacts PS1. Of course, the supply of fluid to the other end of the cylinder 514 results in the transfer grapple 500 being returned to its position at the base of the mast 602. It is when the return of the transfer grapple 500 has been fully completed that the contacts PS1 are opened because of the pressure that has then built up so as to de-energize the relay 4CR. The de-energization of the relay 4CR opens once again its contacts 4CR2, thereby allowing the solenoid valve SV5 to close in readiness for the processing of the next tree. Likewise, contacts 4CR3 close in preparation for the subsequent closing of the pushbutton switch PB2. The contacts 3CR3, quite obviously, close when the relay 3CR becomes de-energized which it does when the limit switch LS1 is re-opened by reason of the sheave mechanism 636 rising when the delimbing head 610 descends. The point to be appreciated is that everything is in condition for the delimbing of the next tree, including the recharging of the cylinders 746 and 766. It should be remembered that only a momentary depressing of the pushbutton switch PB2 is necessary to start the delimbing action and the subsequent shifting of the tree to the collector 800, thereby allowing the operator to manipulate the boom assembly 200 and the boom grapple 300 mounted thereon so as to select another tree while the delimbing action takes place.

The foregoing is repeated until the collector 800 has become full of trees T5 as illustrated in FIGURE 18. If desired, the trees T5 may be tied with heavy wire to form a bundle. It is then that the frame 804 is tilted into a horizontal position in preparation for dumping the accumulated trees onto the ground. However, the swing platform 110 is first rotated through substantially 180° by the hydraulic motor 116 so as to allow the trees that have been collected to be deposited rearwardly of the vehicle 100. More specifically, one advantage of the present invention is that the accumulated trees can be laid in the same path that the vehicle 100 follows when going into the wooded area to be cleared of trees. All that need be done after the trees have been deposited on the ground, such trees having been labeled T6 in FIGURES 19 and 21, is to bring in a skidder so as to drag the trees to their destination. It will also be recognized that each pile of trees T6 will constitute a given cordage, whether loose or tied in a bundle. Stated somewhat differently, the collection of the trees T5 in the collector 800 results in an automatic measuring of the amount of merchantable wood that has been processed.

The manner in which the frame 804 is tilted from its vertical position to its horizontal position is not automatic, quite obviously. All that the operator has to do, however, is to cause fluid to be introduced into the cylinders 890 so that their respective piston rods 894 are projected outwardly. This results in the arms 886 rotating or pivoting in a counterclockwise direction as viewed in FIGURE 16. This results in the frame 804 assuming the horizontal position depicted in FIGURE 19. It is then that the operator causes fluid to be supplied to the cylinders 826 so that the unloader arms 816 are swung from the position shown in FIGURE 20 to the position shown in FIGURE 21, thereby allowing the tree-length logs T6 to be dumped onto the ground as they appear in FIGURES 19 and 21.

Once again, it should be mentioned that the hydraulic and electrical circuitry illustrated in FIGURE 23 has not been presented to the extent that would result in all of the various piston rods that are used when practicing our invention being returned to their initial position. An example would be the retraction of the piston rods 850 into their cylinders 848 so as to return the push-in arm unit 846 to its original or open position. Cylinders 330, 410 and 412, and 342 have already been referred to as not having the hydraulic circuitry shown in conjunction with these cylinders which would result in the return of their respective piston rods to their original position and these situations constitute further examples. Nonetheless, a sufficiently detailed hydraulic and electric circuit has been given so as to demonstrate quite vividly how the operator is relieved of supervising the delimbing and subsequent shifting of each tree into the collector 800 and also allowing the apparatus to be efficiently utilized since the boom assembly 200 is then available for foraging the next tree to be cut and delimbed. One nicety of the invention, however resides in the requirement that the delimbing action be manually initiated (but thereafter automatically continued), for the time for cutting and delivering the cut tree to the delimbing station will vary from tree to tree.

What is claimed is:

1. High-speed tree harvesting apparatus comprising a vehicle, means on said vehicle for delimbing trees in an upright position, means carried by said vehicle for delivering cut trees to said delimbing means, and means on said vehicle for removing trees, while still in an upright position, from said delimbing means.

2. High-speed tree harvesting apparatus in accordance with claim 1 including means on said vehicle for collecting delimbed trees, said removing means including means for holding and transferring trees to said collecting means.

3. High-speed tree harvesting apparatus in accordance with claim 2 in which said delimbing means includes a vertical mast, a delimbing head guided for movement along said mast, and means for raising said delimbing head.

4. High-speed tree harvesting apparatus in accordance with claim 3 including means controlled by said raising means for actuating said transferring means after said delimbing head has been raised.

5. High-speed tree harvesting apparatus in accordance with claim 4 in which said raising means includes a flexible cable, expansible motor means, a sheave mechanism for multiplying the motion produced by said expansible motor means so as to pull said cable at an accelerated rate to rapidly elevate said delimbing head and delimb trees by impact shearing, said actuating means including a limit switch operated by said sheave mechanism when said sheave mechanism has traversed a distance sufficient to complete the delimbing of a tree.

6. High-speed tree harvesting apparatus in accordance with claim 4 including means controlled by said transferring means for releasing a tree held thereby when said transferring means reaches a transfer position relative said collecting means.

7. High-speed tree harvesting apparatus in accordance with claim 4 including means for releasing a tree held by said transferring means, means for forcing a tree transferred by said transferring means with said collecting means, and sequencing means for causing said releasing means to release a tree and to then cause said forcing means to force said tree into said collecting means.

8. High-speed tree harvesting apparatus in accordance with claim 7 in which said raising means also lowers said delimbing head, and means controlled by said sequencing means for causing said raising and lowering means to lower said delimbing head.

9. High-speed tree harvesting apparatus in accordance with claim 8 in which said last-mentioned means causes said delimbing head to be lowered when said transferring means releases said tree.

10. High-speed tree harvesting apparatus in accordance with claim 9 including a limit switch engageable by said transferring means when said transferring means reaches its said transfer position to initiate operation of said sequencing means.

11. High-speed tree harvesting apparatus in accordance with claim 2 in which said transferring means includes a frame, a plurality of jaws on said frame for holding the tree to be transferred in its said upright position, and means mounting said frame for swinging movement about a vertical axis to effect the transfer of said tree to said collecting means.

12. High-speed tree harvesting apparatus in accordance with claim 2 in which said collecting means includes a generally U-shaped frame forming a tree-receiving interior and an entrance opening thereto through which the incoming trees to be accumulated move from said transferring means.

13. High-speed tree harvesting apparatus in accordance with claim 12 including a restraining mechanism disposed in said tree-receiving interior and acted upon by the foremost incoming trees as they are accumulated in the collecting means.

14. High-speed tree harvesting apparatus in accordance with claim 13 in which said restraining mechanism includes upper and lower transverse bars engaged by the foremost incoming trees, a pair of link members pivotally connected to each other intermediate their ends, said upper bar being fixedly attached to one link member and said lower bar being fixedly attached to the other link member, and a cylinder and piston, said piston being connected to said other link member so as to be forced farther into said cylinder by the foremost incoming trees.

15. High-speed tree harvesting apparatus in accordance with claim 14 in which said U-shaped frame is tiltable so as to move its said opening from a generally vertical position to a generally horizontal one.

16. High-speed tree harvesting apparatus in accordance with claim 15 including means for closing said opening until the accumulated trees are to be discharged therethrough after said frame has been tilted to cause said opening to assume its said horizontal position.

17. High-speed tree harvesting apparatus in accordance with claim 16 in which said closing means includes a pair of pivotal arms, a gate on each of said arms yieldable only in the direction in which the incoming trees move.

18. High-speed tree harvesting apparatus in accordance with claim 17 including a pair of additional gates on said frame also yieldable only in the direction in which the incoming trees move.

19. High-speed tree harvesting apparatus in accordance with claim 18 including means for holding said arms in an angular position to cause said arms and gates to effectively block said opening.

20. High-speed tree harvesting apparatus in accordance with claim 19 in which said arm-holding means is movable to swing said arms in a direction to separate the gates on said arms from the gates on said frame to open said entrance opening after said frame has been tilted to move said opening into its said generally horizontal position.

21. High-speed tree harvesting apparatus in accordance with claim 1 including a mechanism associated with said delimbing means for topping a tree after said delimbing means has reached a tree portion of predetermined diminished size.

22. High-speed tree harvesting apparatus in accordance with claim 21 in which said delimbing means includes contractible curved blades having upwardly directed knife edges, and means actuated by sufficient inward movement of one of said blades for initiating operation of said topping mechanism.

23. High-speed tree harvesting apparatus in accordance with claim 22 in which said delimbing means includes a delimbing head, said curved blades being pivotally mounted on said head, and said topping mechanism being superimposed on said head above said curved blades, said topping mechanism including a pair of flat blades pivotally disposed on spaced parallel axes and having upwardly directed straight knife edges for effecting the topping of the tree when at least one of said straight edges is moved toward the other.

24. High-speed tree harvesting apparatus in accordance with claim 23 in which said delimbing means includes a cable for raising said delimbing head, said topping mechanism including a cylinder and piston and said cable pulling on said piston when lowering said head to develop a pressure increase means for storing energy resulting from said pressure increase and means operated by said stored energy to cause at least one of said flat blades to pivot its straight knife edge inwardly toward the other straight edge to effect the topping of said tree.

25. High-speed tree harvesting apparatus in accordance with claim 24 in which said last means includes a cylinder and piston, said cylinder being in circuit with said energy storing means for pivoting said flat blades inwardly, and said means actuated by sufficient inward movement of said one curved blade includes a normally closed valve that prevents application of said stored energy to the second-mentioned cylinder until said valve has been opened by said one curved blade.

26. High-speed tree harvesting apparatus in accordance with claim 25 including a cylinder and piston for each of said curved blades, said last-mentioned cylinders being in circuit with said energy storing means and their said pistons being connected to said curved blades for forcibly contracting said curved blades against the tree being delimbed due to the release of stored energy as said head is pulled upwardly by said cable.

27. High-speed tree harvesting apparatus comprising a vehicle, means on said vehicle for delimbing trees in an upright position, an extensible and retractable boom assembly mounted at one end on said vehicle, a boom grapple on the other end of said boom assembly swingable from a first angularly disposed position for gripping a standing tree when said boom assembly is extended and a second angularly disposed position for delivering the tree after it is cut when said boom assembly is retracted, a shear mechanism also mounted on the other end of said boom assembly at a location subjacent said boom grapple for cutting a standing tree while gripped by said boom grapple while in its said first angularly disposed position, and a transfer grapple associated with said delimbing means swingable from a first angularly disposed position for gripping a tree delivered by said boom grapple when in its said second angularly disposed position to a second angularly disposed position for releasing said tree after delimbing thereof.

28. High-speed tree harvesting apparatus in accordance with claim 27 including collecting means for receiving delimbed trees from said transfer grapple.

29. High-speed tree harvesting apparatus in accordance with claim 28 in which said vehicle includes a swing platform, said boom assembly being mounted near one side of said platform, said delimbing means being mounted centrally thereon, and said collecting means being mounted near the other side, said collecting means having an opening facing in the same direction in which said boom assembly is extensible.

30. High-speed tree harvesting apparatus in accordance with claim 29 in which said collecting means includes yieldable gates to allow passage of an upright delimbed tree thereinto from said transfer grapple when said transfer grapple is in its said second angularly disposed position.

31. High-speed tree harvesting apparatus in accordance with claim 30 in which said collecting means is tiltable from a generally vertical position to a generally horizontal one to permit dumping of trees accumulated in said collecting means, the swinging of said platform allowing dumping of said trees generally rearward of the direction in which the vehicle advances to cut the trees.

32. High-speed tree harvesting apparatus in accordance with claim 31 including a pair of pivotal arms each having one of said gates thereon so that said arms and the gates thereon effectively close said opening while said collecting means is in its said vertical position yet allowing delimbed trees to pass into the collecting means from said transfer grapple, said arms being swingable so as to allow the accumulated trees to drop gravitationally from said collecting means when in its said horizontal position.

33. High-speed tree harvesting apparatus in accordance with claim 32 in which said collecting means includes a restraining mechanism for maintaining said accumulated trees upright in said collecting means while said collecting means is in its said vertical position.

34. High-speed tree harvesting apparatus comprising a vehicle, means on said vehicle for delimbing trees in an upright position, collecting means carried on said vehicle for accumulating delimbed trees, and means for holding and transferring a tree, while still in an upright position, from said delimbing means to said collecting means.

35. High-speed tree harvesting apparatus in accordance with claim 34 including means controlled by said transferring means for releasing a tree held thereby when said transferring means reaches a transfer position relative said collecting means.

36. High-speed tree harvesting apparatus in accordance with claim 35 including means for releasing a tree held by said transferring means, means for forcing a tree transferred by said transferring means into said collecting means, and sequencing means for causing said releasing means to release a tree and to then cause said forcing means to force said tree into said collecting means.

37. High-speed tree harvesting apparatus in accordance with claim 36 in which said transferring means includes a frame, a plurality of jaws on said frame for holding the tree to be transferred in its said upright position, and means mounting said frame for swinging movement about a vertical axis to affect the transfer of said tree to said collecting means.

38. High-speed tree harvesting apparatus in accordance with claim 37 in which said collecting means is tiltable from a generally vertical position to a generally horizontal one to permit dumping of trees accumulated in said collecting means.

39. High-speed tree harvesting apparatus in accordance with claim 38 in which said collecting means includes a restraining mechanism for maintaining said accumulated trees upright in said collecting means while said collecting means is in its said vertical position.

40. High-speed tree harvesting apparatus in accordance with claim 39 including a mechanism associated with said delimbing means for topping a tree after said delimbing means has reached a tree portion of predetermined diminished size.

41. High-speed tree harvesting apparatus in accordance with claim 40 in which said topping mechanism includes a pair of relatively movable blades having upwardly directed knife edges, and hydraulic circuitry for actuating at least one of said blades in a direction to move said knife edges closer together to top a tree after it has been delimbed.

42. High-speed tree harvesting apparatus in accordance with claim 40 in which said topping mechanism includes normally inactive knife edge means for effecting the topping action, expansible chamber means for producing a change in pressure as said delimbing means moves downwardly to store energy, and means operated by stored energy for actuating said normally inactive knife edge means as said delimbing means moves upwardly.

43. High-speed tree harvesting apparatus in accordance with claim 42 including means for delaying operation of said last means until said delimbing means has reached a tree portion of predetermined diminished size.

44. High-speed tree harvesting apparatus combining a vehicle, means for delivering a vertically disposed cut tree to a predetermined location on said vehicle, means for delimbing said vertical tree at said predetermined location, means for transferring the tree, while still vertical, after it has been delimbed to a second predetermined location on said vehicle, collector means for accumulating a number of such trees, and means for successively shifting delimbed trees, while still vertical, from said second predetermined location into said collector means.

45. High-speed tree harvesting apparatus in accordance with claim 44 including means for manually initiating operation of said delimbing means, and means responsive to said delimbing means for automatically operating said transferring means upon completion of the delimbing of a tree.

46. High-speed tree harvesting apparatus in accordance with claim 45 including means responsive to said transferring means upon reaching said second predetermined location for causing said delimbing means to return to its starting position in preparation for delimbing a second tree.

47. High-speed tree harvesting apparatus in accordance with claim 46 including means also responsive to said transferring means at said second predetermined location for causing release of the tree being transferred.

48. High-speed tree harvesting apparatus in accordance with claim 47 in which said last-mentioned means sequentially operates said shifting means after release of the tree being transferred.

49. High-speed tree harvesting apparatus in accordance with claim 48 in which said last-mentioned means concomitantly with the operation of said shifting means causes said transferring means to return to said first predetermined location.

References Cited

UNITED STATES PATENTS

| | | | |
|---|---|---|---|
| 3,140,736 | 7/1964 | Propst | 144—309 |
| 3,269,436 | 8/1966 | Moore | 144—3 |
| 3,329,184 | 7/1967 | Longert | 144—3 |
| 3,348,592 | 10/1967 | Winblad et al. | 144—309 |
| 3,356,116 | 12/1967 | Brundell | 144—309 |

GERALD A. DOST, Primary Examiner

U.S. Cl. X.R.

144—34, 309

PO-1050
(5/69)

UNITED STATES PATENT OFFICE
CERTIFICATE OF CORRECTION

Patent No. 3,487,864        Dated January 6, 1970

Inventor(s) Robert W. Larson and John P. Lundberg

It is certified that error appears in the above-identified patent and that said Letters Patent are hereby corrected as shown below:

Column 6, line 45, "climbed" should be --delimbed--. Column 7, line 63, after "portion" insert --of--. Column 17, line 2, "shave" should be --shove--. Column 21, line 67, "affect" should be --effect--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents